US012596762B2

(12) United States Patent (10) Patent No.: US 12,596,762 B2
Naito et al. (45) Date of Patent: *Apr. 7, 2026

(54) METHOD FOR PROVIDING INFORMATION, METHOD FOR GENERATING DATABASE, AND PROGRAM

(71) Applicant: SoundHound AI IP, LLC., Santa Clara, CA (US)

(72) Inventors: Masaki Naito, Nagano (JP); Keisuke Tsuchida, Tokyo (JP); Jun Yoneyama, Tokyo (JP); Kaku Sawada, Tokyo (JP)

(73) Assignee: SoundHound AI IP, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,973

(22) Filed: May 13, 2024

(65) Prior Publication Data

US 2024/0296197 A1 Sep. 5, 2024

Related U.S. Application Data

(63) Continuation of application No. 17/649,052, filed on Jan. 26, 2022, now Pat. No. 11,995,143.

(30) Foreign Application Priority Data

May 31, 2021 (JP) ................................. 2021-091752

(51) Int. Cl.
*G06F 16/95* (2019.01)
*G06F 16/334* (2025.01)
(Continued)

(52) U.S. Cl.
CPC ...... *G06F 16/9566* (2019.01); *G06F 16/3344* (2019.01); *G06F 40/40* (2020.01); *G10L 15/26* (2013.01)

(58) Field of Classification Search
CPC .. G06F 16/9566; G06F 16/3344; G06F 40/40; G06F 16/90332; G06F 40/30; G10L 15/26; G10L 15/1822; G10L 2015/223
See application file for complete search history.

(56) References Cited

U.S. PATENT DOCUMENTS 10,855,627 B2 * 12/2020 Eidem ................... H04L 67/306
2013/0018944 A1 * 1/2013 Shyamsunder ....... G06F 16/955
709/203

(Continued)

FOREIGN PATENT DOCUMENTS

JP 2000132473 A 5/2000
JP 2015148910 A 8/2015
WO 2015146017 A1 10/2015

OTHER PUBLICATIONS

Contexts, Handsfree for Web—Voice Control—Browse using your voice, https://www.handsfreeforweb.com/en/.

(Continued)

*Primary Examiner* — Apu M Mofiz
*Assistant Examiner* — Cindy Nguyen
(74) *Attorney, Agent, or Firm* — Platinum Intellectual Property PC

(57) ABSTRACT

As audio (1) is input to an extension of a browser, the extension transmits the audio (1) to a language processing server. A speech recognition unit obtains a text (1) corresponding to the audio (1), and transmits the text (1) to a natural language understanding unit. In the natural language understanding unit, an information processing unit identifies a URL (1) corresponding to the text (1), and transmits the URL (1) to the browser. The extension passes the URL (1) to a browsing function. The browsing function uses the URL (1) to access a web server. The web server transmits a web page (1) corresponding to the URL (1) to the browser. The (Continued)

browsing function shows a screen corresponding to the web page (1) on a display.

18 Claims, 39 Drawing Sheets

(51) Int. Cl.
G06F 16/955 (2019.01)
G06F 40/40 (2020.01)
G10L 15/26 (2006.01)

(56) References Cited

U.S. PATENT DOCUMENTS

2014/0372119 A1 12/2014 Parada et al.
2018/0007201 A1 1/2018 Kurganov
2022/0159094 A1 5/2022 Aoki

OTHER PUBLICATIONS

Han, Sungjae, Geunseong Jung, Minsoo Ryu, Byung-Uk Choi, and Jaehyuk Cha. "A voice-controlled web browser to navigate hierarchical hidden menus of web pages in a smart-tv environment." In Proceedings of the 23rd International Conference on World Wide Web, pp. 587-590. 2014.
Implement your own voice commands, Handsfree for Web—Voice Control—Browse using your voice, https://www.handsfreeforweb.com/en/.
Libby, Alex. Introducing the HTML5 Web Speech API: Your Practical Introduction to Adding Browser-Based Speech Capabilities to your Websites and Online Applications. Apress, 2020.
Modules, Handsfree for Web—Voice Control—Browse using your voice, https://www.handsfreeforweb.com/en/.
Patel, Meetkumar. "Weboice: Voice Enabled Web Browser." PhD diss., California State University, Sacramento, 2017.
Pérez, Javier. "Navegación web dirigida por comandos de voz." PhD diss., Universidad Nacional de La Plata, 2019.
Su, Yu, Ahmed Hassan Awadallah, Madian Khabsa, Patrick Pantel, Michael Gamon, and Mark Encarnacion. "Building natural language interfaces to web apis." In Proceedings of the 2017 ACM on Conference on Information and Knowledge Management, pp. 177-186. 2017.
Uday, Gobbur, Kale Ketan, Umbarkar Dipak, and Neharkar Swapnil. "Voice based Internet Browser." International Journal of Computer Applications 66, No. 8 (2013).
Voice Access app, Google Play.
Voice commands guide, Handsfree for Web—Voice Control—Browse using your voice, https://www.handsfreeforweb.com/en/.
Web Speech API: Draft Community Group Report, https://wicg.github.io/speech-api/#introduction, Aug. 18, 2020.
Website voice commands, Handsfree for Web—Voice Control—Browse using your voice, https://www.handsfreeforweb.com/en/.
伊東一樹, 平川昌宏, and 筧捷彦. "音声操作可能な Web ブラウザの開発." 第 75 回全国大会講演論文集 2013, No. 1 (2013): 525-526.
JPO office action of counterpart JP patent application No. 2021-091752, dated Dec. 24, 2024.

* cited by examiner

FIG.9

GRAMMAR-INTENT DATABASE

| GRAMMAR | INTENT | TYPE |
|---|---|---|
| OPEN THE WEB MAIL | OPEN THE WEB MAIL | NEW |
| OPEN THE MAIN PAGE | | |
| OPEN A WEB MAIL PAGE | | |
| : | : | : |
| SHOW UNREAD MESSAGES | SHOW UNREAD MESSAGES | NEW |
| : | : | : |
| SHOW MESSAGES FROM [*1] | SHOW MESSAGES RECEIVED FROM [*1] | NEW |
| : | : | : |
| SHOW MESSAGES THAT CONTAIN [*2] IN THE SUBJECT | SHOW MESSAGES THAT CONTAIN [*2] IN THE SUBJECT | NEW |
| : | : | : |
| AMONG THEM, SHOW UNREAD MESSAGES | SHOW UNREAD MESSAGES | FOLLOW UP |
| : | : | : |
| AMONG THEM, SHOW MESSAGES FROM [*3] | SHOW MESSAGES RECEIVED FROM [*3] | FOLLOW UP |
| : | : | : |
| AMONG THEM, SHOW MESSAGES THAT CONTAIN [*4] IN THE SUBJECT | SHOW MESSAGES THAT CONTAIN [*4] IN THE SUBJECT | FOLLOW UP |
| : | : | : |
| AMONG THEM, SHOW MESSAGES RECEIVED AFTER [*5], [*6] [*7] | SHOW MESSAGES RECEIVED AFTER [*5], [*6] [*7] | FOLLOW UP |
| : | : | : |

FIG.10

INTENT-URL DATABASE

| INTENT | TYPE | URL |
|---|---|---|
| OPEN THE WEB MAIL | NEW | https://mail.AAA.com |
| SHOW UNREAD MESSAGES | NEW | https://mail.AAA.com/mail/u/0/#search/is%3Aunread |
| SHOW MESSAGES RECEIVED FROM [*1] | NEW | https://mail.AAA.com/mail/u/0/#search/from%3A[*1] |
| SHOW MESSAGES THAT CONTAIN [*2] IN THE SUBJECT | NEW | https://mail.AAA.com/mail/u/0/#search/subject%3A[*2] |
| .. | .. | .. |
| SHOW UNREAD MESSAGES | FOLLOW UP | +is%3Aunread (/mail/u/0/#search/is%3Aunread) |
| SHOW MESSAGES RECEIVED FROM [*3] | FOLLOW UP | +from%3A[*3] (/mail/u/0/#search/from%3A[*3]) |
| SHOW MESSAGES THAT CONTAIN [*4] IN THE SUBJECT | FOLLOW UP | +subject%3A[*4] (/mail/u/0/#search/subject%3A[*4]) |
| SHOW MESSAGES RECEIVED AFTER [*5], [*6] [*7] | FOLLOW UP | +newer%3A[*5]%2F[*6]%2F[*7] (/mail/u/0/#search/newer%3A[*5]%2F[*6]%2F[*7]) |
| .. | .. | .. |

Figure 16:
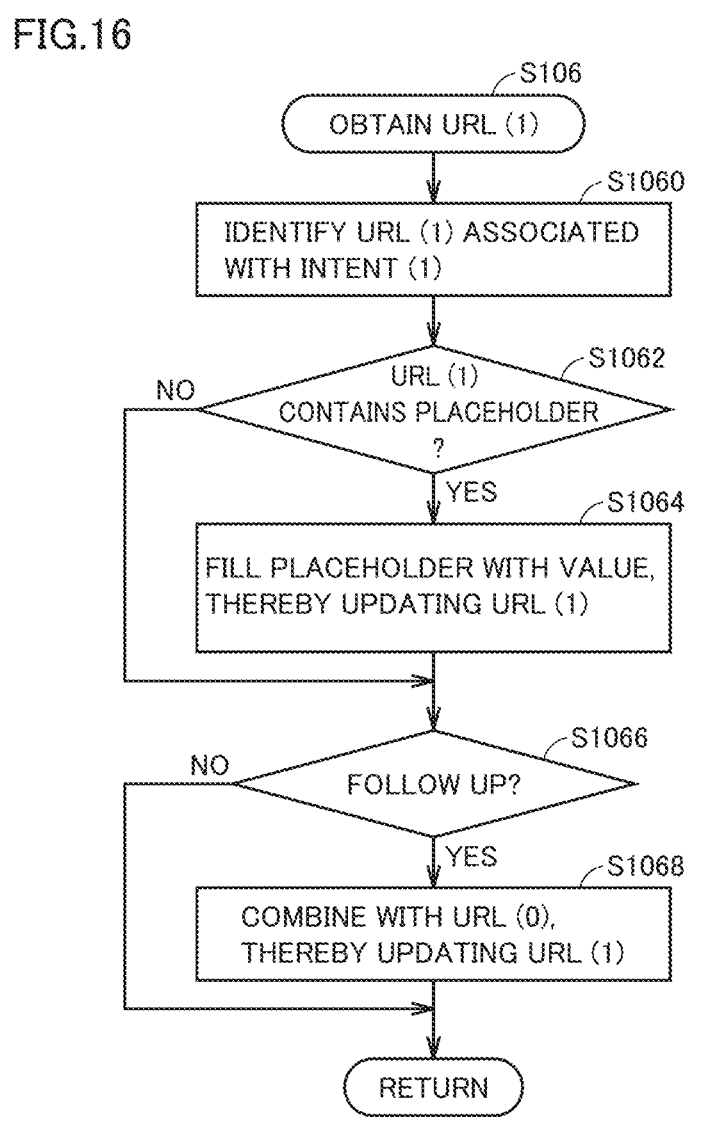

( OBTAIN URL (1) )

S1060

IDENTIFY URL (1) ASSOCIATED
WITH INTENT (1)

S1062

URL (1)
CONTAINS PLACEHOLDER
?

NO

YES

S1064

FILL PLACEHOLDER WITH VALUE,
THEREBY UPDATING URL (1)

S1066

FOLLOW UP?

NO

YES

S1068

COMBINE WITH URL (0),
THEREBY UPDATING URL (1)

( RETURN )

FIG.22

| AVAILABLE URL LIST |
| --- |
| https://mail.AAA.com |
| https://BBB.com |
| https://CCC.co.jp |
| : |

FIG.30

INTENT–URL DATABASE

| INTENT | TYPE | URL | SERVICE PROVIDER |
|---|---|---|---|
| OPEN THE WEB MAIL | NEW | https://mail.AAA.com | COMPANY AAA |
| SHOW UNREAD MESSAGES | NEW | https://mail.AAA.com/mail/u/0/#search/is%3Aunread | COMPANY AAA |
| SHOW MESSAGES RECEIVED FROM [*1] | NEW | https://mail.AAA.com/mail/u/0/#search/from%3A[*1] | COMPANY AAA |
| SHOW MESSAGES THAT CONTAIN [*2] IN THE SUBJECT | NEW | https://mail.AAA.com/mail/u/0/#search/subject%3A[*2] | COMPANY AAA |
| .. | .. | .. | .. |
| SHOW UNREAD MESSAGES | FOLLOW UP | +is%3Aunread (/mail/u/0/#search/is%3Aunread) | COMPANY AAA |
| SHOW MESSAGES RECEIVED FROM [*3] | FOLLOW UP | +from%3A[*3] (/mail/u/0/#search/from%3A[*3]) | COMPANY AAA |
| SHOW MESSAGES THAT CONTAIN [*4] IN THE SUBJECT | FOLLOW UP | +subject%3A[*4] (/mail/u/0/#search/subject%3A[*4]) | COMPANY AAA |
| SHOW MESSAGES RECEIVED AFTER [*5], [*6] [*7] | FOLLOW UP | +newer%3A[*5]%2F[*6]%2F[*7] (/mail/u/0/#search/newer%3A[*5]%2F[*6]%2F[*7]) | COMPANY AAA |
| .. | .. | .. | .. |

FIG.31

INFORMATION PROVIDER COUNTER

| SERVICE PROVIDER / YEAR/MONTH | AAA | BBB | · · · |
|---|---|---|---|
| 2021/1 | 205 | 10 | · · · |
| 2021/2 | 32 | 980 | · · · |
| 2021/3 | 140 | 245 | · · · |
| : | : | : | : |

FIG.35

GRAMMAR-INTENT DATABASE

| GRAMMAR | INTENT | TYPE |
|---|---|---|
| OPEN THE WEB MAIL | OPEN THE WEB MAIL | NEW |
| OPEN THE MAIN PAGE | | |
| OPEN A WEB MAIL PAGE | | |
| .. | | |
| SHOW UNREAD MESSAGES | SHOW UNREAD MESSAGES | NEW |
| .. | | |
| SHOW MESSAGES FROM [*1] | SHOW MESSAGES RECEIVED FROM [*1] | NEW |
| .. | | |
| SHOW MESSAGES THAT CONTAIN [*2] IN THE SUBJECT | SHOW MESSAGES THAT CONTAIN [*2] IN THE SUBJECT | NEW |
| .. | .. | .. |
| AMONG THEM, SHOW UNREAD MESSAGES | SHOW UNREAD MESSAGES | FOLLOW UP |
| .. | | |
| AMONG THEM, SHOW MESSAGES FROM [*3] | SHOW MESSAGES RECEIVED FROM [*3] | FOLLOW UP |
| .. | | |
| AMONG THEM, SHOW MESSAGES THAT CONTAIN [*4] IN THE SUBJECT | SHOW MESSAGES THAT CONTAIN [*4] IN THE SUBJECT | FOLLOW UP |
| .. | | |
| AMONG THEM, SHOW MESSAGES RECEIVED AFTER [*5], [*6] [*7] | SHOW MESSAGES RECEIVED AFTER [*5], [*6] [*7] | FOLLOW UP |
| .. | | |
| HOW ABOUT [*8]? | INTENT IDENTIFIED BY CONVERSATION STATE | SPECIAL FOLLOW UP |

METHOD FOR PROVIDING INFORMATION, METHOD FOR GENERATING DATABASE, AND PROGRAM

CROSS-REFERENCES TO RELATED APPLICATIONS

This application is a continuation application of U.S. Non-Provisional patent application Ser. No. 17/649,052, entitled "METHOD FOR PROVIDING INFORMATION, METHOD FOR GENERATING DATABASE, AND PRO-GRAM", filed on Jan. 26, 2022, which claims the priority of Japan Patent Application No. 2021-091752, entitled "METHOD FOR PROVIDING INFORMATION, METHOD FOR GENERATING DATABASE, AND PRO-GRAM," filed May 13, 2021, which is incorporated herein by reference for all purposes.

FIELD OF THE INVENTION

The present disclosure relates to providing a browser with an URL.

BACKGROUND

Conventionally, using a browser, a user is provided with services via a network. For example, Japanese Patent Lay-ing-Open No. 2020-091907 (PTL 1) discloses a technology in which a browser presents web content about products or services.

In recent years, with an increase in the range of services provided via a network, a user is given increased opportu-nities for receiving services using a browser. Demographics of users receiving such services are also broadened. Then, the demand for facilitating browser operations that are required for users to receive services is also increased.

The present disclosure is made in view of such circum-stances, and an object of the present disclosure is to provide a technology for facilitating browser operations.

SUMMARY OF THE INVENTION

According to a certain aspect of the present disclosure, a computer-implemented method for providing information is provided. The method includes obtaining an inquiry intent based on inquiry information input to a user terminal. The inquiry information includes at least one of audio and a text. The method further includes obtaining a response URL corresponding to the inquiry intent, in accordance with a relationship, defined in an intent-URL database, between one or more intents and respectively corresponding one or more URLs; and providing the response URL to a browser installed in the user terminal.

According to other aspect of the present disclosure, a computer-implemented method for generating an intent-URL database is provided. The method includes: obtaining a URL having a placeholder two or more phrases; and obtaining two or more phrases. The two or more phrases are each associated with an intent and have a slot. The method includes extracting, from among the two or more phrases, a phrase that has a slot corresponding to the placeholder of the URL, and generating the intent-URL database by associating the URL and the extracted phrase.

According to a certain aspect of the present disclosure, as the inquiry information is input to the user terminal, the browser installed in the user terminal is provided with a URL (the response URL) corresponding to the intent (the inquiry intent) of the inquiry information. This allows the user to obtain the URL corresponding to the user intent, without having to directly input the intend URL.

According to other aspect of the present disclosure, the URL is associated with the intent associated with a phrase having a slot corresponding to a placeholder of the URL, thereby generating an intent-URL database. The use of the intent-URL database thus generated allows a URL associ-ated with the intent to be provided to the user in response to the user intent being obtained. This allows the user to obtain a URL corresponding to the user intent, without having to directly input the intend URL.

BRIEF DESCRIPTION OF THE DRAWINGS

FIG. 9 is a diagram showing one example data structure for a grammar-intent database 122.

FIG. 10 is a diagram showing one example data structure for an intent-URL database 123.

FIG. 16 is a flowchart of a sub routine of step S106 of FIG. 11.

FIG. 22 is a diagram showing one example data structure of an available URL list 124.

FIG. 30 is a diagram showing one example data structure of an intent-URL database 123 in an example of FIG. 29.

FIG. 31 is a diagram showing one example data structure of an information provider counter 125.

FIG. 35 is a diagram showing a variation of a grammar-intent database 122.

FIG. 36 is a flowchart of a variation of the process of FIG. 11.

FIG. 39 is a diagram for illustrating a flow of construction of an intent-URL database in the example of FIG. 38.

DETAILED DESCRIPTION

Hereinafter, one embodiment of an information providing system will be described, with reference to the accompanying drawings. In the following description, the same reference sign is used to refer to like parts and components, which are assigned the same name and have the same function. Thus, descriptions of them will not be repeated.

Embodiment 1

1. Configuration of Information Providing System

Figure 1:
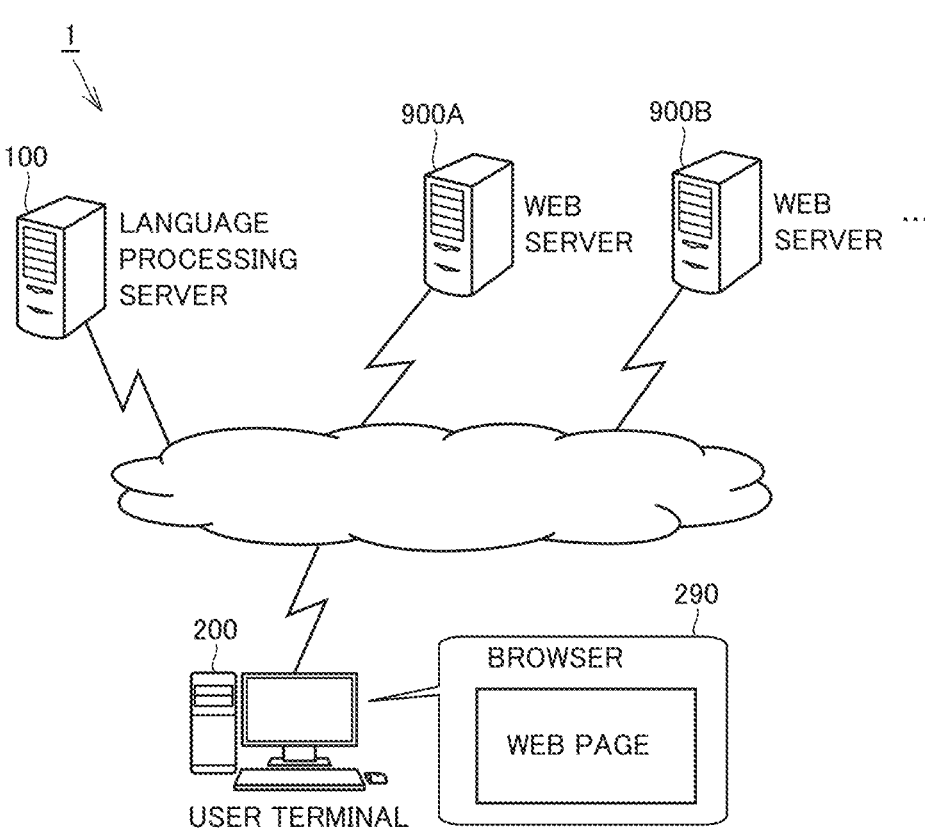
FIG. 1 is a diagram showing one example configuration of an information providing system according to Embodiment 1.

FIG. 1 is a diagram showing one example configuration of an information providing system according to Embodiment 1. The information providing system 1 includes a language processing server 100, a user terminal 200, and web servers 900A, 900B. Herein, when referring to a common nature of the web servers 900A, 900B, the term "web server 900" may be used.

In the information providing system 1, as a user inputs audio in accordance with a certain intent to the user terminal 200, the web server 900 provides the user with a service corresponding to the intent.

More specifically, as the user inputs audio to the user terminal 200, the user terminal 200 transmits the audio to the language processing server 100. The language processing server 100 transmits to the user terminal 200 a uniform resource locator (URL) corresponding to an intent of the audio input from the user terminal 200. Using the URL transmitted from the language processing server 100, the user terminal 200 accesses the web server 900 and receives services from the web server 900.

2. Hardware Configuration (Language Processing Server)

Figure 2:
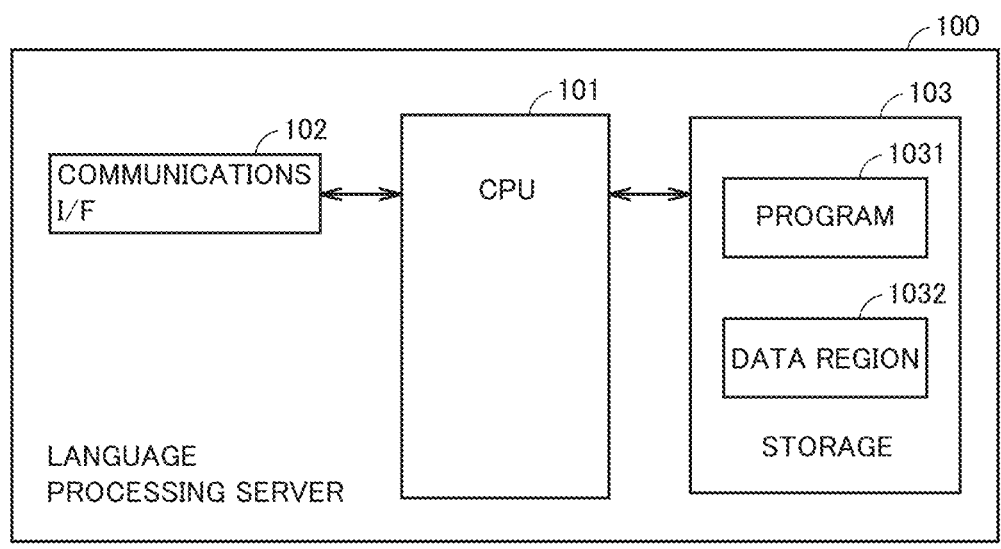
FIG. 2 is a diagram showing one example hardware configuration of a language processing server 100.

FIG. 2 is a diagram showing one example hardware configuration of the language processing server 100. The language processing server 100 includes a central processing unit (CPU) 101, a communications interface (I/F) 102, and a storage 103. The storage 103 includes a program region 1031 storing various programs, and a data region 1032 storing various data.

The CPU 101 executes programs stored in the storage 103 or an external storage device, thereby performing various computations.

The communications I/F 102 is implemented by, for example, a network card, and allows the language processing server 100 to communicate with other devices included in the information providing system 1.

3. Hardware Configuration (User Terminal)

Figure 3:
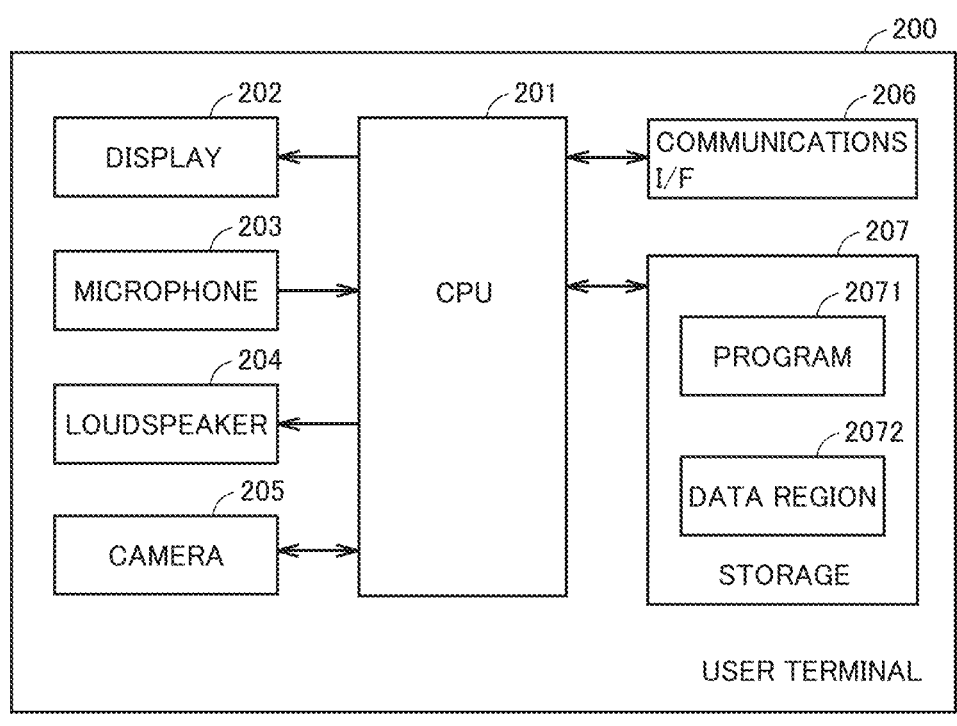
FIG. 3 is a diagram showing one example hardware configuration of a user terminal 200.

FIG. 3 is a diagram showing one example hardware configuration of the user terminal 200. The user terminal 200 includes a CPU 201, a display 202, a microphone 203, a loudspeaker 204, a camera 205, a communications I/F 206, and a storage 207. The storage 207 includes a program region 2071 storing various programs, and a data region 2072 storing various data.

The CPU 201 executes programs stored in the storage 207 or an external storage device, thereby performing various computations.

The display 202 shows a screen instructed by the CPU 201. The microphone 203 inputs the input audio to the CPU 201. The loudspeaker 204 outputs audio instructed by the CPU 201. The camera 205 inputs a captured image to the CPU 201.

The communications I/F 206 is implemented by, for example, a network card, and allows the user terminal 200 to communicate with other devices included in the information providing system 1.

4. Process Overview

Referring to FIGS. 4 to 8, an overview of one example process in the information providing system 1 is now described for providing the user terminal 200 with an URL in response to the input of information to the user terminal 200.

Figure 4:
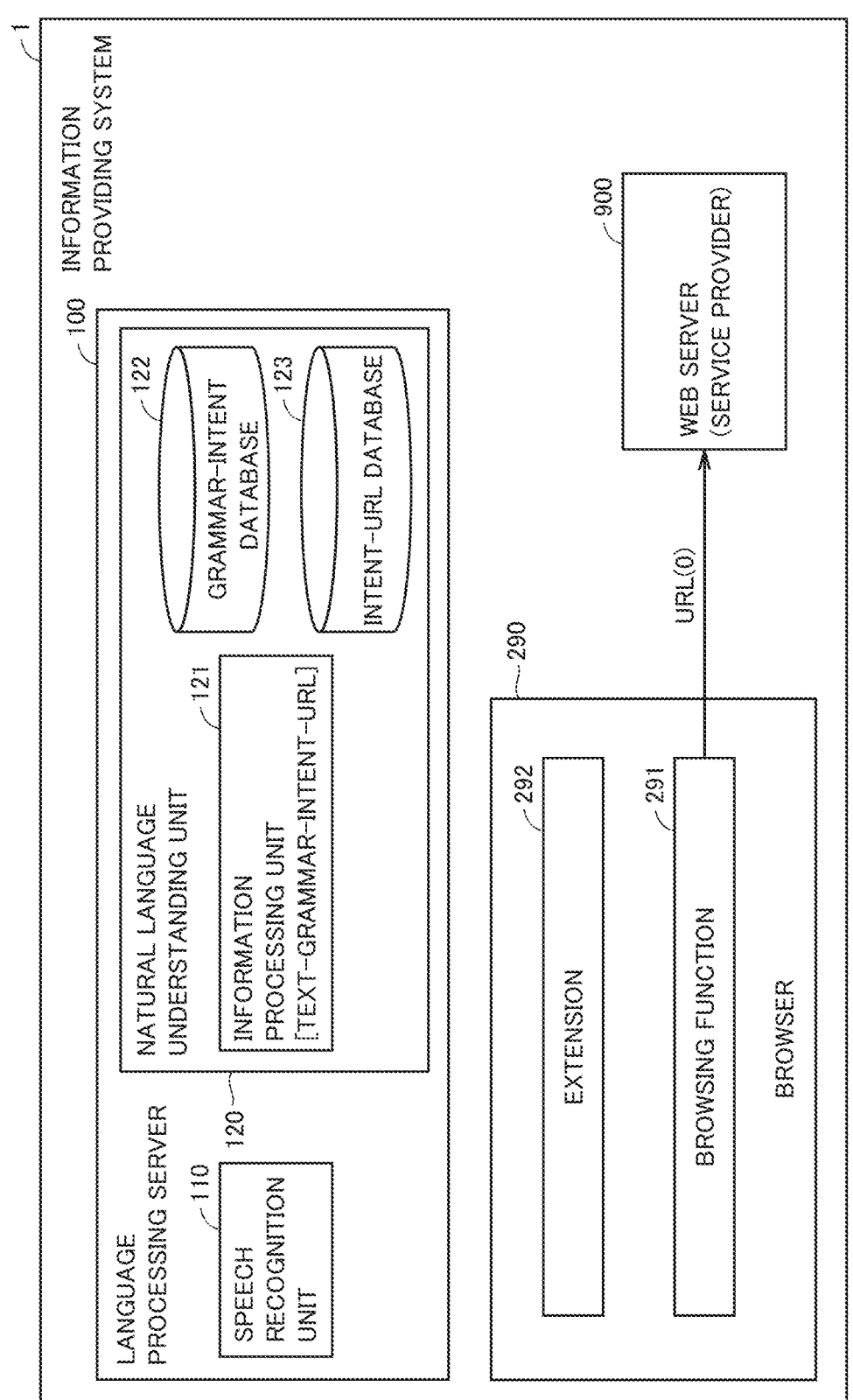
FIG. 4 is a diagram showing one example of functions of respective elements included in the information providing system 1.

(1) Functional Configurations of Respective Elements Included in the Information Providing System FIG. 4 is a diagram showing one example of functions of respective elements included in the information providing system 1. The language processing server 100 includes a speech recognition unit 110 and a natural language understanding unit 120. The speech recognition unit 110 transcribes an input audio into a text, using speech recognition technique. In one example, the natural language understanding unit 120 is implemented by the CPU 101 executing a given program.

The natural language understanding unit 120 includes an information processing unit 121, a grammar-intent database 122, and an intent-URL database 123. The information processing unit 121 identifies an intent corresponding to an input text, and identifies a URL corresponding to the identified intent. In one example, the information processing unit 121 is implemented by the CPU 101 executing a given program.

The grammar-intent database 122 is used to identify the intent corresponding to a text. The intent-URL database 123 is used to identify a URL corresponding to an intent. The grammar-intent database 122 and the intent-URL database 123 are stored in the storage 207, for example.

A browser 290 installed in the language processing server 100 includes a browsing function 291 and an extension 292. The browsing function 291 implements general functions of a browser application, including accessing a network using a URL input to the browser 290. The extension 292 implements expansive features for the browser application. For example, the extension 292 is implemented as a plug-in program of the browser application.

(2) Process Overview

Referring to FIGS. 4 to 8, an overview of a process is now described which is performed for the browser 290 to obtain a URL in response to audio input from a user.

(2-1) Phase 1

Initially, the browser 290 obtains a URL (0). The URL (0) may be input to the browser 290 by the user or pre-set at the browser 290. In response to obtaining the URL (0), the browsing function 291 accesses the web server 900, using the "URL (0)."

(2-2) Phase 2

Figure 5:
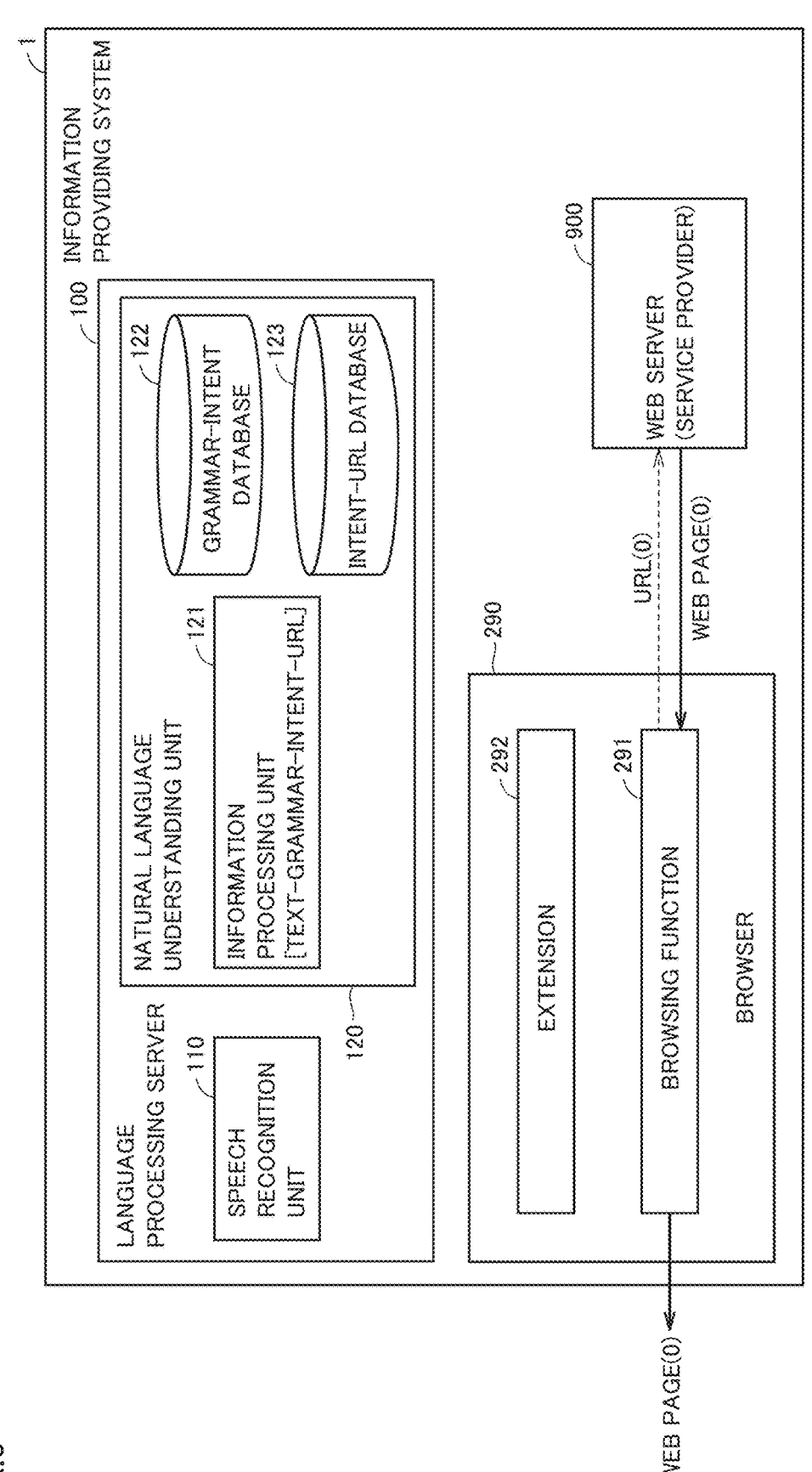
FIG. 5 is a diagram showing one example of the next state after the state shown in FIG. 4.

FIG. 5 is a diagram showing one example of the next state after the state shown in FIG. 4. As shown in FIG. 5, in response to the access using the "URL (0)," the web server 900 transmits to the browsing function 291 a web page corresponding to the "URL (0)." The transmitted web page is represented as a "web page (0)" in FIG. 5. The browser 290 shows a screen of the web page (0) on the display 202. Note that the screen of the web page (0) may be previously registered with the browsing function 291. In other words, the browsing function 291 may show the screen of the web page (0) on the display 202, without accessing the web server 900.

(2-3) Phase 3

Figure 6:
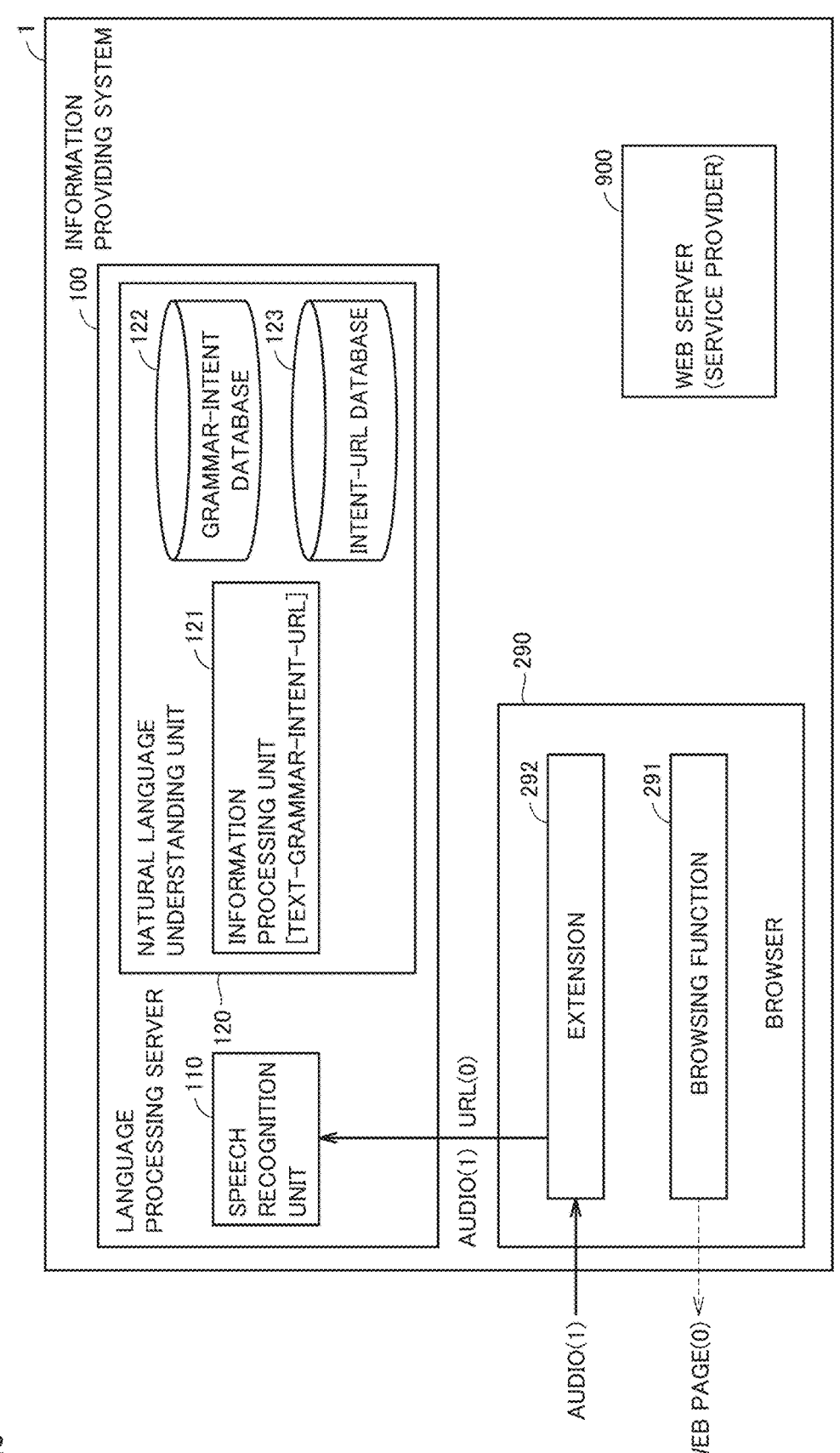
FIG. 6 is a diagram showing one example of the next state after the state shown in FIG. 5.

FIG. 6 is a diagram showing one example of the next state after the state shown in FIG. 5. As shown in FIG. 6, audio is input to the extension 292. The input audio is represented as "audio (1)" in FIG. 6. In response to the input of the audio (1), the extension 292 transmits the audio (1) to the language processing server 100. The extension 292 further transmits to the language processing server 100 the URL (URL (0)) of the screen displayed at the time of the input of the audio (1). In the language processing server 100, the speech recognition unit 110 processes the input audio (1).

(2-4) Phase 4

Figure 7:
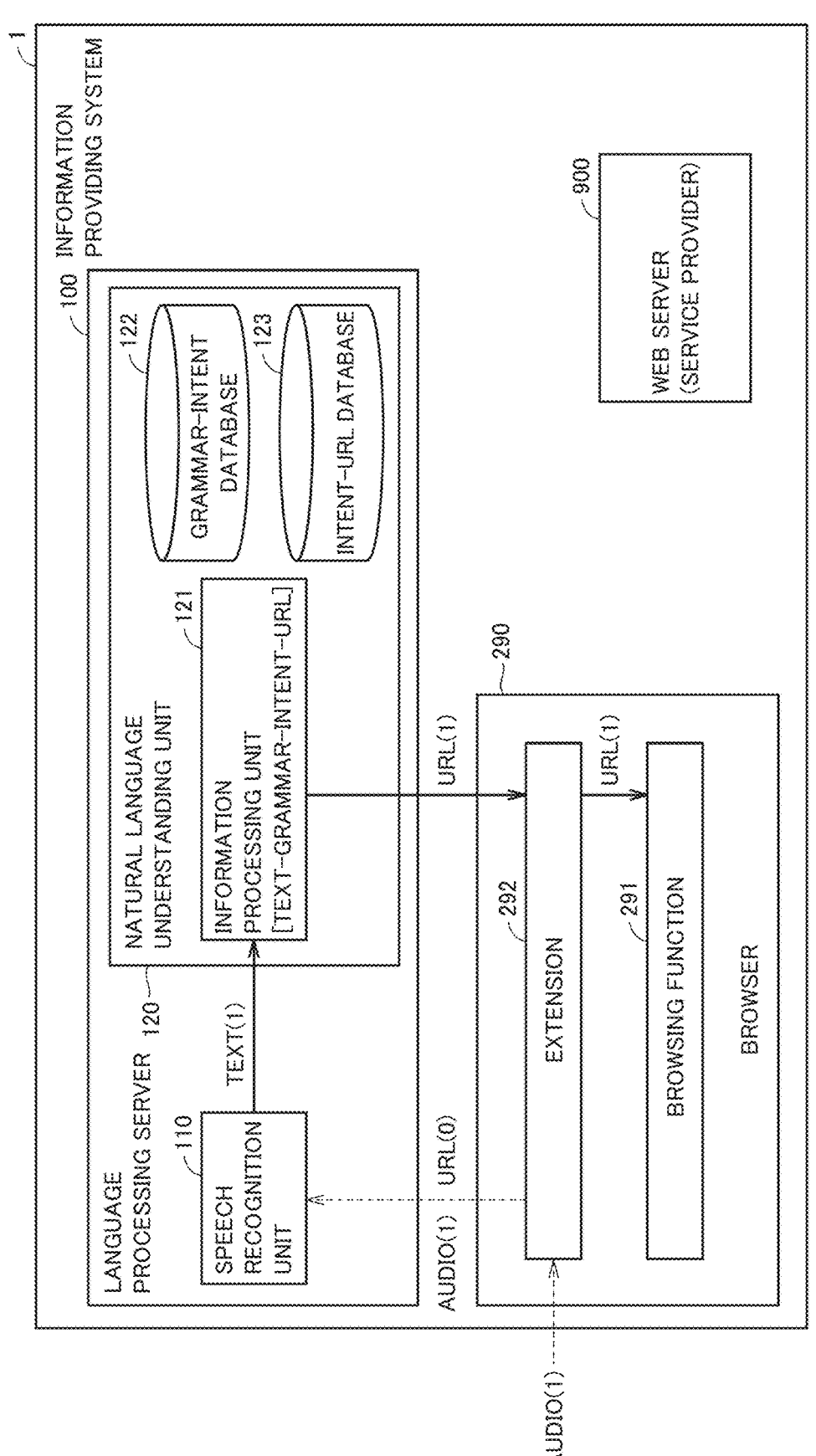
FIG. 7 is a diagram showing one example of the next state after the state shown in FIG. 6.

FIG. 7 is a diagram showing one example of the next state after the state shown in FIG. 6. As shown in FIG. 7, the speech recognition unit 110 processes the audio (1), thereby obtaining a text corresponding to the audio (1). The obtained text is represented as a "text (1)." The speech recognition unit 110 transmits the text (1) to the natural language understanding unit 120.

In the natural language understanding unit 120, the information processing unit 121 analyzes the text (1) in accordance with natural language processing, and thereby identifies the intent of the text (1). In one example, the information processing unit 121 identifies a grammar conforming to the text (1) and identifies an intent corresponding to the identified grammar, thereby identifying the intent of the text (1). In one example, the grammar-intent database is used for the identification of the intent.

The information processing unit 121 identifies a URL corresponding to the identified intent. In FIG. 7, the identified URL is represented as a "URL (1)." In one example, the intent-URL database is used for the identification of the URL. The information processing unit 121 then transmits the identified URL to the browser 290.

In the browser 290, the extension 292 obtains the URL (1) transmitted from the language processing server 100 (the information processing unit 121), and passes it to the browsing function 291.

(2-5) Phase 5

Figure 8:
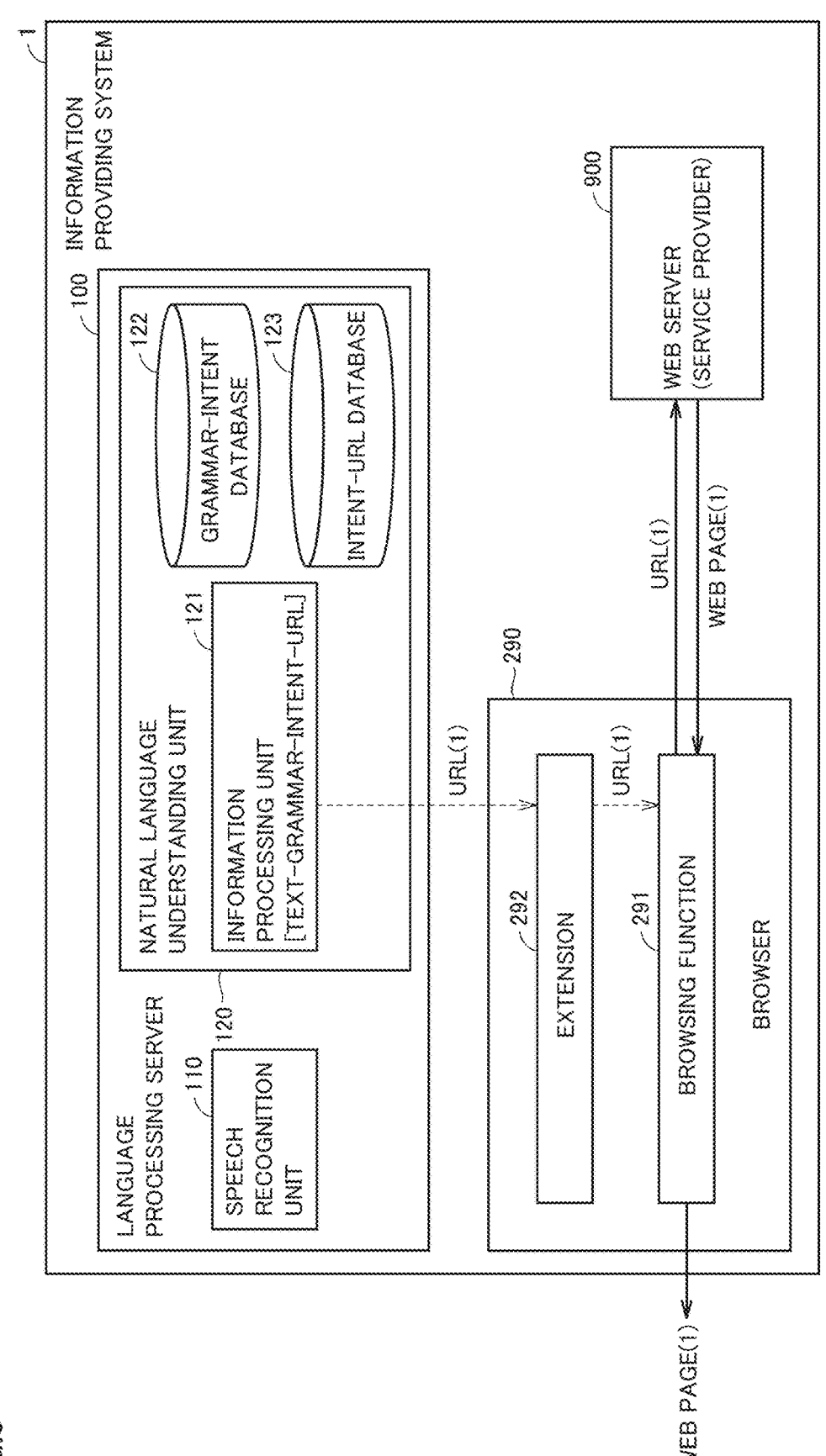
FIG. 8 is a diagram showing one example of the next state after the state shown in FIG. 7.

FIG. 8 is a diagram showing one example of the next state after the state shown in FIG. 7. As shown in FIG. 8, using the URL (1) passed from the extension 292, the browsing function 291 accesses the web server 900, in response to which the web server 900 transmits a web page corresponding to the URL (1), as one example of providing a service corresponding to the URL (1). The transmitted web page is represented as a "web page (1)."

The extension 292 presents to the user the service received from the web server 900. Upon receipt of the web page (1), the extension 292 shows a screen of the web page (1) on the display 202.

In the examples described above with reference to FIGS. 4 to 8, the audio (1) is one example of an "inquiry information." The intent obtained based on the audio (1) (the intent identified for the text (1)) is one example of an "inquiry intent." The grammar conforming to the audio (1) (i. e., the text (1)) is one example of an "inquiry grammar." The URL (1) provided in response to the input of audio (1) is one example of a "response URL." The URL (0) corresponding to the screen displayed at the time of the input of the audio (1) is one example of a "previous URL."

5. Grammar-Intent Database

FIG. 9 is a diagram showing one example data structure of the grammar-intent database 122. The example of FIG. 9 corresponds to a web mail service provided by the web server 900.

FIG. 9 shows two or more grammars, two or more intents, and two or more types. For the grammar-intent database 122, one grammar is associated with one intent and one type.

The grammar is used for analysis in the natural language processing. As specific examples of the grammar, FIG. 9 shows "open the web mail," "open the main page," and "open a web mail page." In the example of FIG. 9, these grammars are associated with the same intent, that is, the intent "open the web mail."

The example of FIG. 9 includes "new" and "follow up" as type values. The value "new" corresponds to an intent that is independent of the other texts from the user. The value "follow up" corresponds to an intent dependent on other texts from the user. The types will be described below, with reference to FIG. 16, etc. In the example of FIG. 9, grammars that include "among the messages" at the beginning of the strings have "follow up" as the type value. However, FIG. 9 merely shows one example relationship between the string included in the grammar and the value of the type.

A set ([*1], etc.) consisting of a sign "*" and a number, which is included in some of the grammars illustrated in FIG. 9, represents a slot. For example, [*1] included in the grammar "show messages from [*1]" represents a slot.

As with the grammars, an intent, corresponding to a grammar that includes a slot, includes a slot. For example, the intent corresponding to the grammar "show messages from [*1]" is "show messages received from [*1]," and includes the same slot [*1] as the grammar. The intent of this grammar is to show messages received from a person indicated by the value of the slot [*1].

The example of FIG. 9 is merely one example association of a grammar and an intent. A specific aspect of association of a grammar with an intent can be set and/or changed by anyone, such as a person who is provided with services, a person who provides services, and/or a person who manages the language processing server 100, etc.

The type of services provided by the web server 900 is not limited to a web mail. Any types of services may be provided, such as web search services, services for providing stock information, services for providing shopping sites and/or community sites, etc.

6. Intent-URL Database

FIG. 10 is a diagram showing one example data structure of the intent-URL database 123.

In the example of FIG. 10, two or more intents, associated with two or more grammars in the example of FIG. 9, are associated with two or more URLs.

For example, the intent "open the web mail" is associated with the URL "https://mail.AAA.com." Moreover, the intent "show unread messages" is associated with the URL "https://mail.AAA.com/mail/u/0/#search/is%3Aunread." Furthermore, the intent "show messages received from [*1]" is associated with the URL "https://mail.AAA.com/mail/u/0/#search/from%3A[*1]."

A URL associated with an intent having a slot, has a placeholder corresponding to the slot. For example, [*1] in the URL "https://mail.AAA.com/mail/u/0/#search/from%3A[*1]" represents a placeholder corresponding to the slot included in the intent. The placeholder is filled with a value corresponding to the value of the slot [*1] in the intent.

In the intent-URL database 123, each URL is associated with a type (new/follow up) associated with a corresponding intent.

A URL having "follow up" as a value of the type only includes a string to be added to other URL. For example, the URL corresponding to the intent [show messages received from [*3]] only includes the string "+ from%3A[*3]" to be added to other URL. Details of generating a new URL by adding a string to other URL will be described below with reference to FIG. 16, etc.

In the example of FIG. 10, the string to be added to other URL begins with a character "+." However, what character with which a string to be added begins can be set for each service provided. For web mail services also, a string to be added may begin with "/" or "&," other than "+."

The example shown in FIG. 10 is merely one example of a set of URLs that can be used in a web mail service. The combination of an additional feature and a string to be added to a URL is not limited those shown in FIG. 10.

For example, in the example of FIG. 10, by comparing the URL "https://mail.AAA.com" and the URL "https://mail.AAA.com/mail/u/0/#search/is%3Aunread," one can understand that the portion "/mail/u/0/#search/is%3Aunread" of the latter URL is a string added to the former URL to implement an additional function for searching for unread messages. However, the set of URLs shown in FIG. 10 is merely one example.

7. Process Flow

Figure 11:
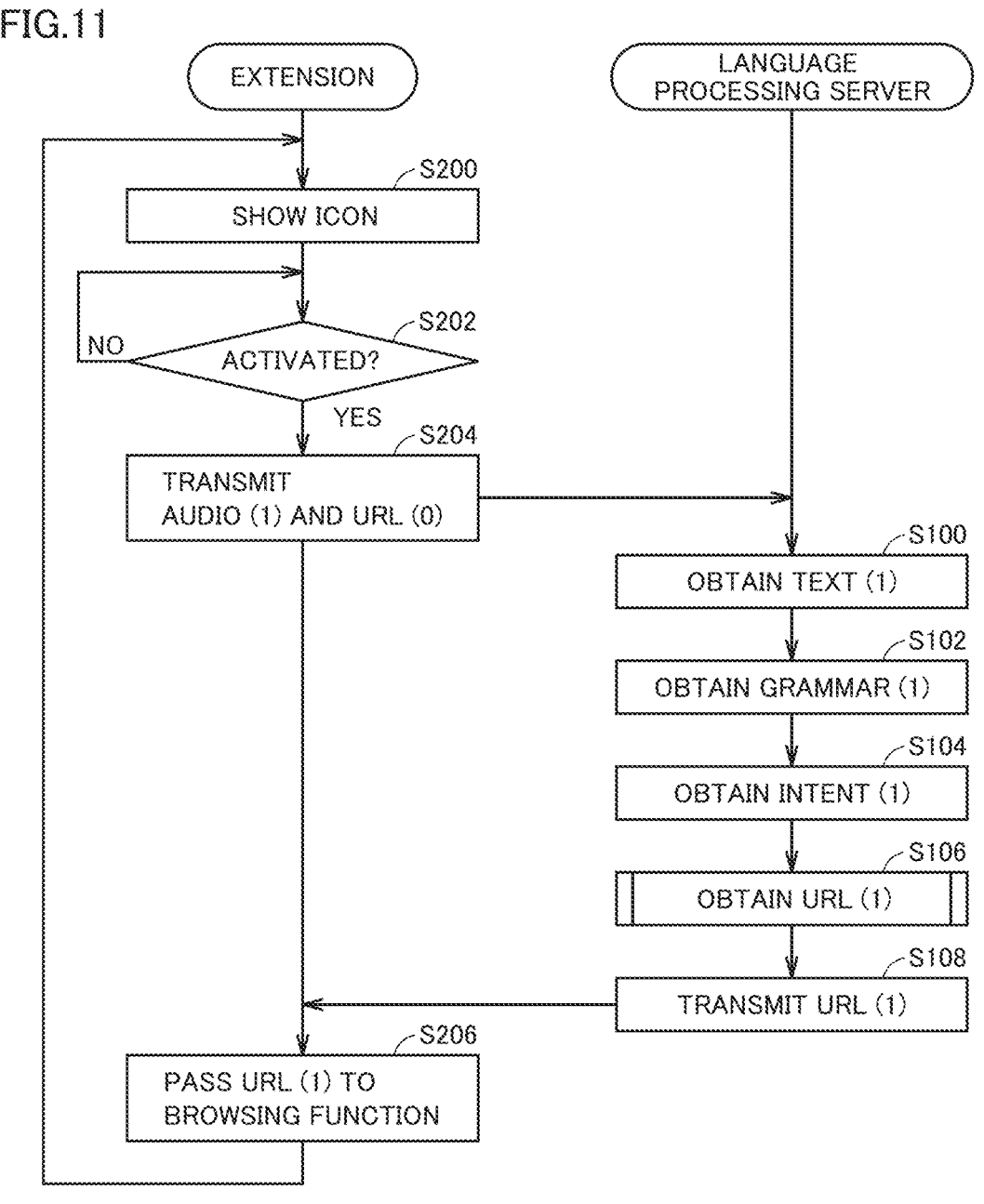
FIG. 11 is a flowchart of a process that is performed, in response to an audio input, for the user terminal 200 to receive a web service corresponding to the audio.

FIG. 11 is a flowchart of a process that is performed, in response to an audio input, for the user terminal 200 to receive a web service corresponding to the audio. The left side of FIG. 11 shows a flowchart of a process that is performed by the user terminal 200. This process is implemented by, for example, the CPU 201, functioning as the extension 292 in the user terminal 200, executing a given program. The right side of FIG. 11 shows a flowchart of a process that is performed by the language processing server 100. This process is implemented by, for example, the CPU 101, functioning as the speech recognition unit 110 and the information processing unit 121 in the language processing server 100, executing a given program.

In step S200, the extension 292 causes the browsing function 291 to show an icon for an audio input on the display 202. The icon for the audio input may be displayed in a web page or displayed at a location (e.g., in the task bar) not directly relevant to a running application.

Figure 12:
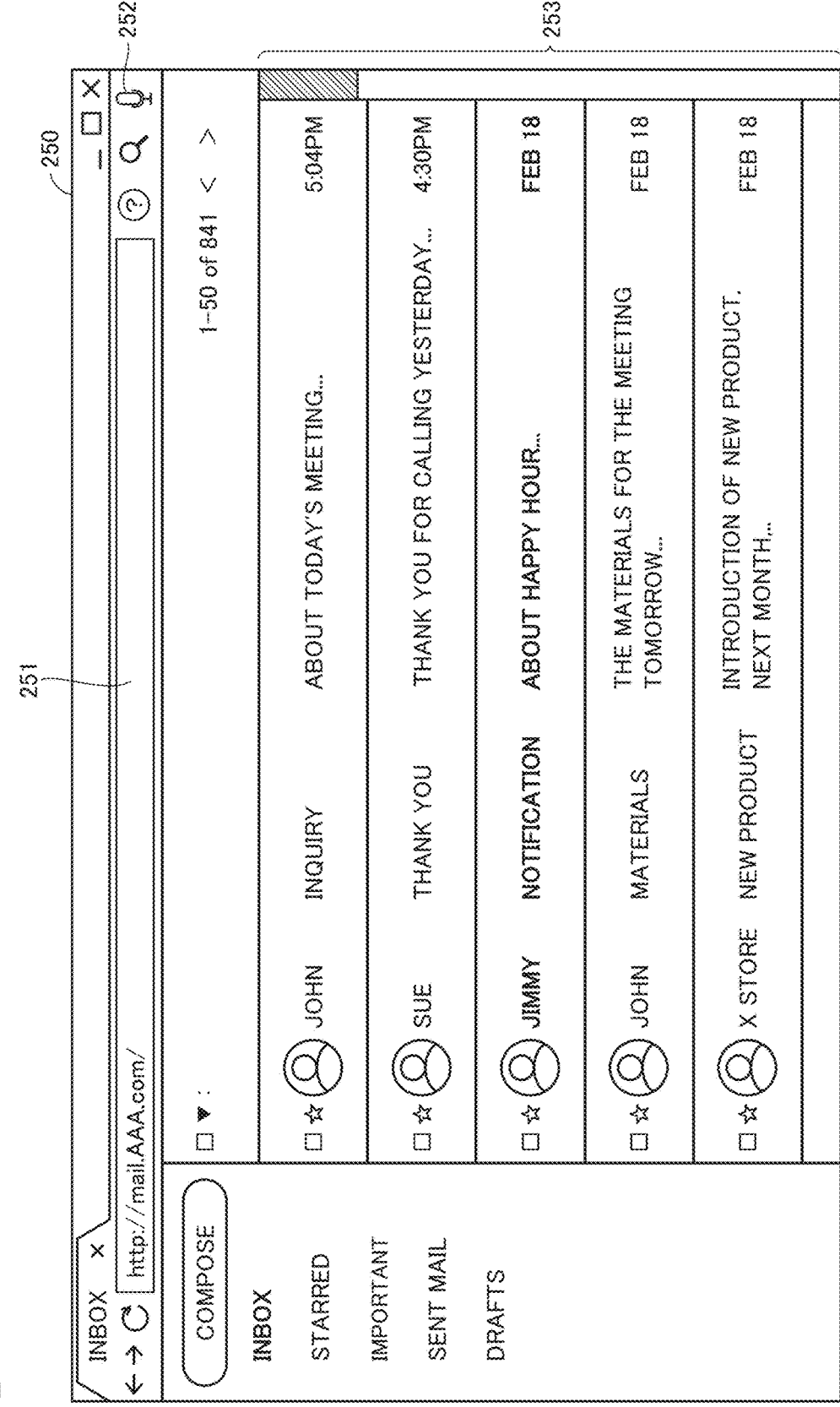
FIG. 12 is a diagram showing one example of a screen of a web page shown on a display 202.

FIG. 12 is a diagram showing one example of a screen of a web page shown on the display 202. A screen 250 shown in FIG. 12 displays a web mail inbox. The screen 250 includes an address bar 251, a microphone icon 252, and a message list 253. The microphone icon 252 is one example of the icon for audio input.

The address bar 251 shows a URL for showing the screen 250. The microphone icon 252 is manipulated by the user to input audio to the user terminal 200. The message list 253 lists the messages in a folder which are selected in the web mail. In one example, in response to one of messages in the message list 253 being selected, the content of the message is displayed by a popup screen, for example.

Returning to FIG. 11, in step S202, the extension 292 determines whether an audio input is activated. The operation to activate an audio input may be clicking on the microphone icon 252, the input of a wake phrase ("activate audio input" etc.) to the microphone 203, or the input of a specific gesture to the camera 205.

The extension 292 repeats control of step S202 (NO in step S202) until the extension 292 determines that an audio input is activated (the operation for the activation is made). If determined that an audio input is activated (YES in step S202), the extension 292 passes control to step S204.

In step S204, the extension 292 transmits to the language processing server 100 the input audio (audio (1)) and a URL (URL (0)) of a web page displayed at that time. In step S204, the extension 292 may display a transcription of the input audio. Further referring to FIGS. 13 and 14, input of audio to the user terminal 200 (the extension 292) at audio input is now described.

Figure 13:
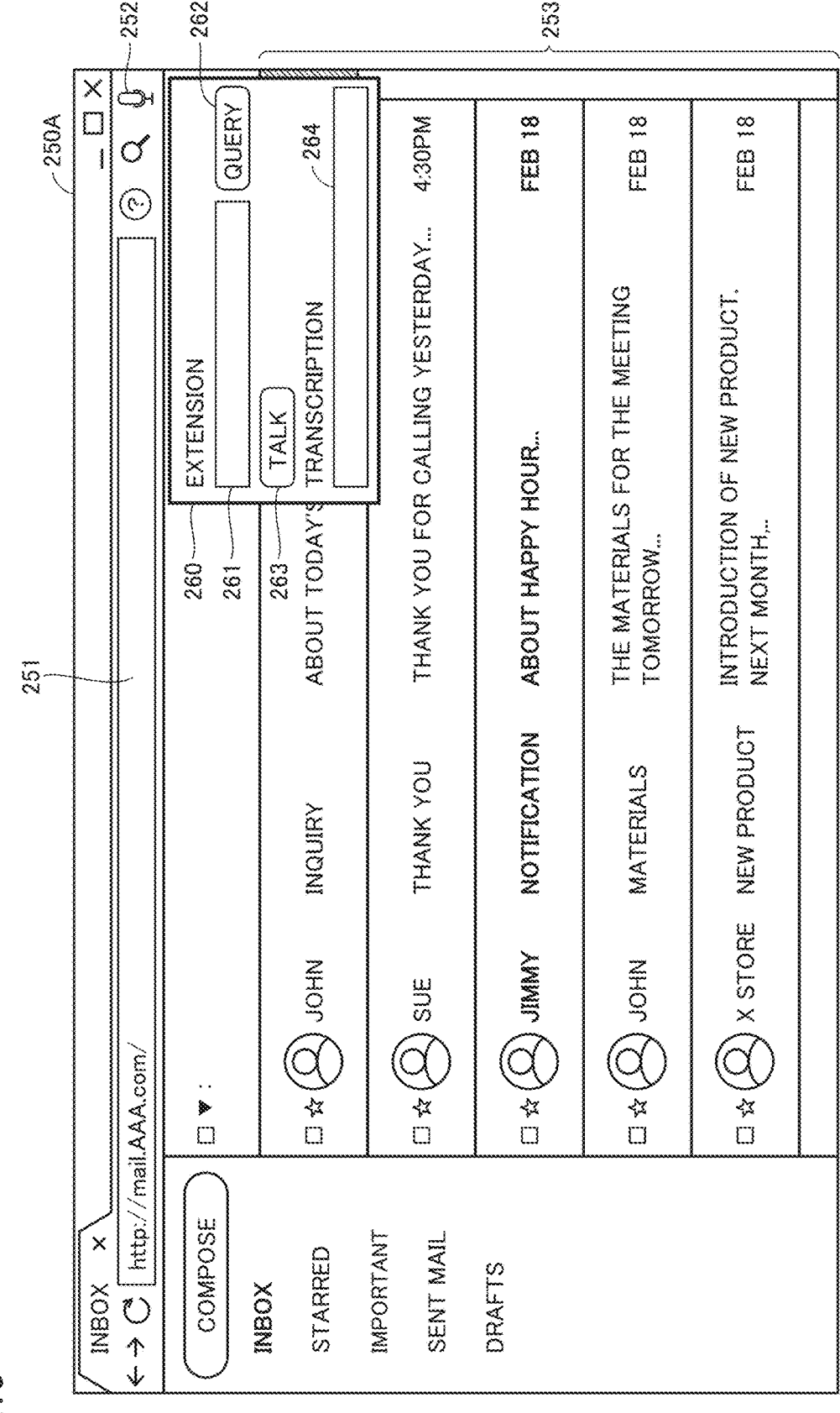
FIG. 13 is a diagram representing a screen 250A that is displayed when a microphone icon 252 is clicked on a screen 250 of FIG. 12.

FIG. 13 is a diagram representing a screen 250A which is displayed when the microphone icon 252 is clicked on the screen 250 of FIG. 12. The screen 250A includes a popup screen 260. The popup screen 260 includes an input field 261, a query button 262, a talk button 263, and a display field 264.

As the operation to activate an audio input is made, the extension 292 receives an audio input until a given condition stands true. One example of the given condition is a pause (no audio is input) for a period of time (e.g., three seconds) or longer.

The extension 292 transmits the input audio to the speech recognition unit 110. The speech recognition unit 110 returns a transcription of the input audio to the extension 292. The extension 292 shows on the display field 264 the transcription transmitted from the speech recognition unit 110.

Figure 14:
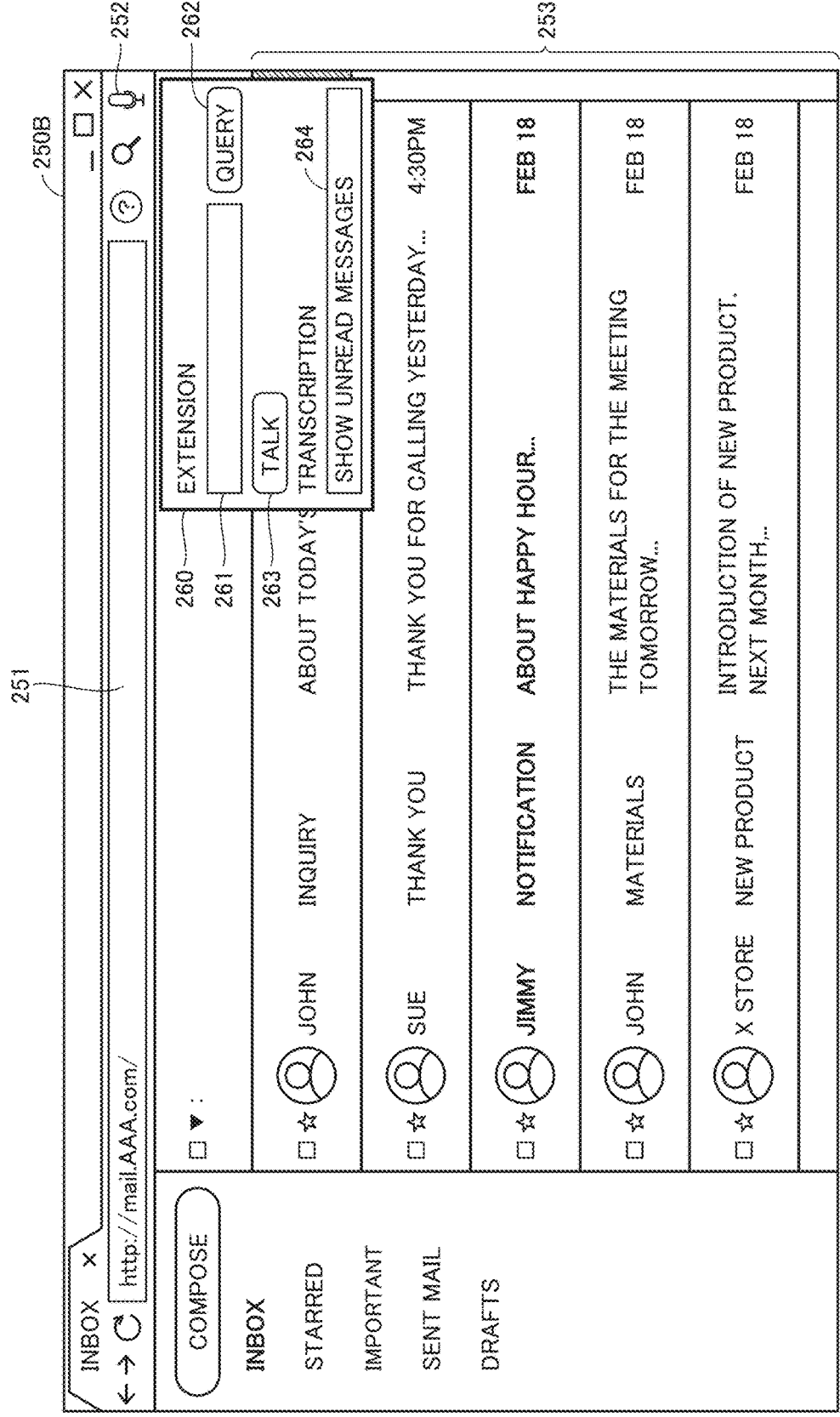
FIG. 14 is a diagram representing a screen 250B which is the screen 250A of FIG. 13 additionally including the indication of a transcription.

FIG. 14 is a diagram representing a screen 250B which is the screen 250A of FIG. 13 additionally including an indication of the transcription. The screen 250B shows the transcription "show unread messages" on the display field 264.

The input field 261 receives input of a text from the user. The query button 262 is manipulated to transmit the text input to the input field 261 to the language processing server 100. As the query button 262 is manipulated, the extension 292, in step S204, transmits the text input to the input field 261 to the language processing server 100, instead of the audio (audio (1)) from the user.

The talk button 263 is manipulated to re-input audio. If the transcription shown on the display field 264 is not as intended by the user, the user manipulates the talk button 263 and then re-inputs audio. In this case, the extension 292 performs the control of step S204 again and transmits the newly input audio to the language processing server 100 as "audio (1)."

FIG. 11 is referred to again. As the language processing server 100 obtains the audio (1) and the URL (0) from the user terminal 200 (the extension 292), the language processing server 100, in step S100, obtains a text (the text (1)) corresponding to the audio (1) through the function of the speech recognition unit 110. As the text thus obtained is transmitted to the user terminal 200, the text is displayed on the user terminal 200 as a transcription, as described with reference to FIG. 14. Note that the transmission of text from the language processing server 100 to the user terminal 200 and the display of a text (transcription) on the user terminal 200 are omitted from FIG. 11.

In step S102, as a function of the information processing unit 121, the language processing server 100 identifies a grammar (a grammar (1)) corresponding to the text obtained in step S100.

In step S104, as a function of the information processing unit 121, the language processing server 100 identifies an intent (an intent (1)) corresponding to the grammar identified in step S102. In one example, the control of step S104 includes identifying, from the grammar-intent database (FIG. 9), the intent that is associated with the grammar identified in step S102.

In step S106, as a function of the information processing unit 121, the language processing server 100 obtains a URL (the URL (1)) corresponding to the intent identified in step S104. In one example, the control of step S106 includes identifying, from the intent-URL database (FIG. 10), an URL that is associated with the intent identified in step S104. The control of step S106 will be described below with reference to FIG. 16.

In step S108, as a function of the information processing unit 121, the language processing server 100 transmits the URL obtained in step S106 to the user terminal 200, and ends the process of FIG. 11.

In step S206, upon receipt of the URL from the language processing server 100, the extension 292 passes the URL to the browsing function 291, and ends the process of FIG. 11.

Note that once the browsing function 291 obtains the URL from the extension 292, the browsing function 291 uses the URL to access the web server 900. The web server 900 transmits to the browsing function 291 a web page corresponding to the URL. The browsing function 291 shows the received web page on the display 202. This switches indications on the display 202.

In the process described above with reference to FIG. 11, as audio is input to the extension 292, the audio is transcribed into a text, and a grammar conforming to the text is identified, and an intent corresponding to the identified grammar is identified. Note that the intent may be directly associated with the audio. In other words, the transcript from the audio to the text and the identification of the grammar may be omitted. A text may also be input, instead of audio. In this case, a grammar conforming to the text is identified, and an intent corresponding to the identified grammar is identified. However, the text may be directly associated with the intent, and the identification of the grammar may be omitted.

Figure 15:
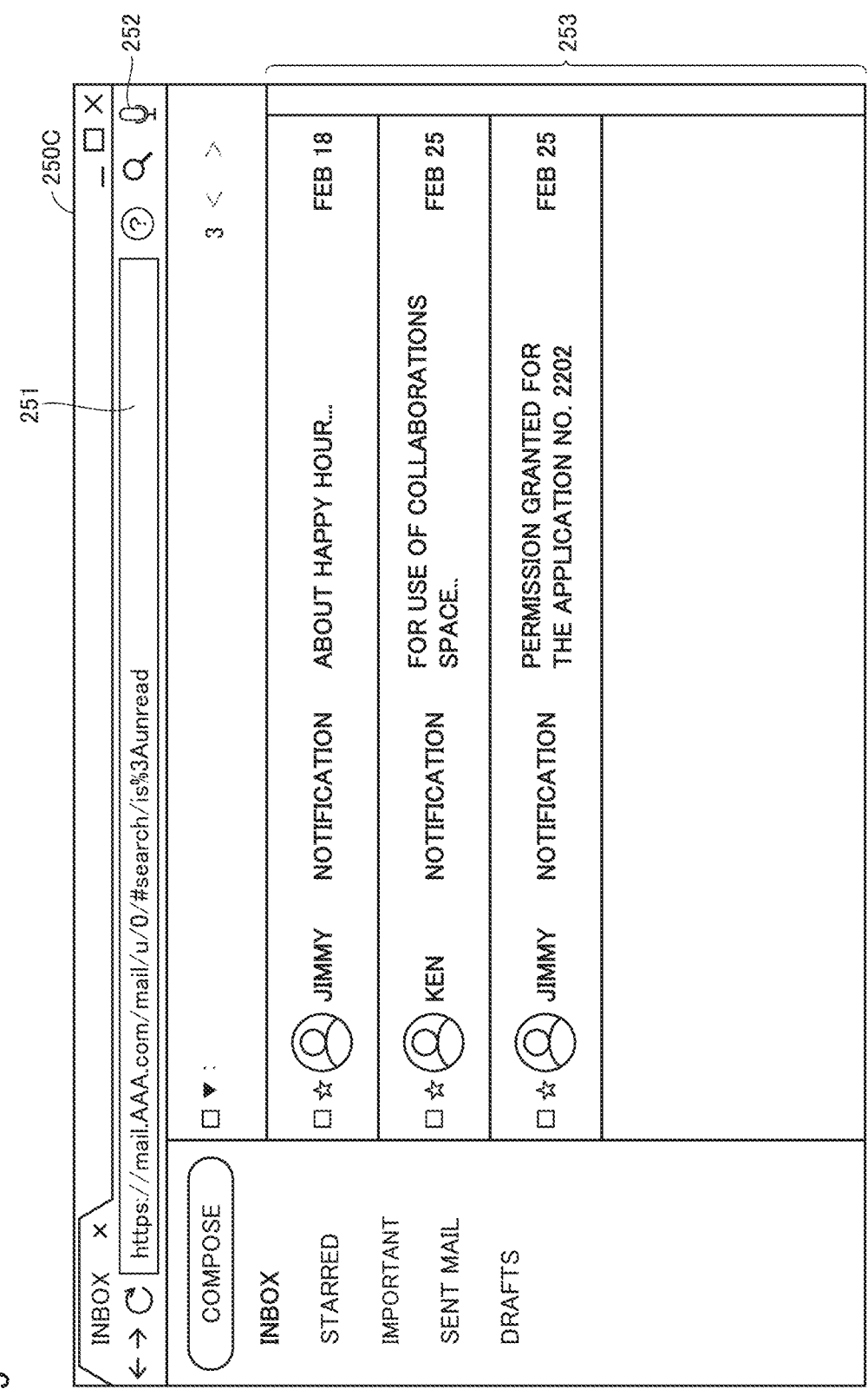
FIG. 15 is a diagram representing a screen 250C showing a web page of an URL corresponding to an audio input from a user.

FIG. 15 is a diagram representing a screen 250C showing a web page of a URL corresponding to the audio input from the user. As the user inputs audio "show unread messages" (FIG. 14), the browsing function 291 shows the screen 250C of FIG. 15 on the display 202. The message list 253 on the screen 250C shows only unread messages among the messages shown in the message list 253 (FIG. 14) of the screen 250B. Details of the content of the screen 250C will be described below.

FIG. 16 is a flowchart of a sub routine of step S106 of FIG. 11. In step S1060, the language processing server 100 identifies the URL (the URL (1)) associated with the intent (the intent (1)) obtained in step S104 (FIG. 11), in the intent-URL database (FIG. 10).

In step S1062, the language processing server 100 determines whether the URL identified in step S1060 contains a placeholder. For example, in the example of FIG. 10, the URL "https://mail.AAA.com" does not contain a placeholder. In contrast, the URL "https://mail.AAA.com/mail/u/0/#search/from%3A[*1]" contains a placeholder ([*1]). Upon determination that the URL contains a placeholder (YES in step S1062), the language processing server 100 passes control to step S1064. Otherwise (NO in step S1062), the language processing server 100 passes control to step S1066.

In step S1064, the language processing server 100 fills the placeholder of the URL identified in step S1060 with a corresponding value included in the input audio, to update the URL. The filling of the placeholder with the value and the URL update in step S1064 will be described below with reference to FIG. 18.

In step S1066, the language processing server 100 determines whether the type of the URL identified in step S1060 is follow up. If determined that the type of the URL is follow up (YES in step S1066), the language processing server 100 passes control to step S1068. Otherwise (NO in step S1066), the language processing server 100 returns control to the process of FIG. 11.

In step S1068, the language processing server 100 combines the URL identified in step S1060 (or the URL updated in step S1064) with the URL (URL (0)) of the web page displayed by the browsing function 291 when the audio is input, thereby updating the URL identified in step S1060 (or the URL updated in step S1064). The URL update in step S1068 will be described below with reference to FIG. 19. Then, the language processing server 100 returns control to FIG. 11.

8. Specific Example of Process

The process flow described with reference to FIG. 16 is now described in greater detail, with reference to a specific example.

8-1. Specific Example (1)

Figure 17:
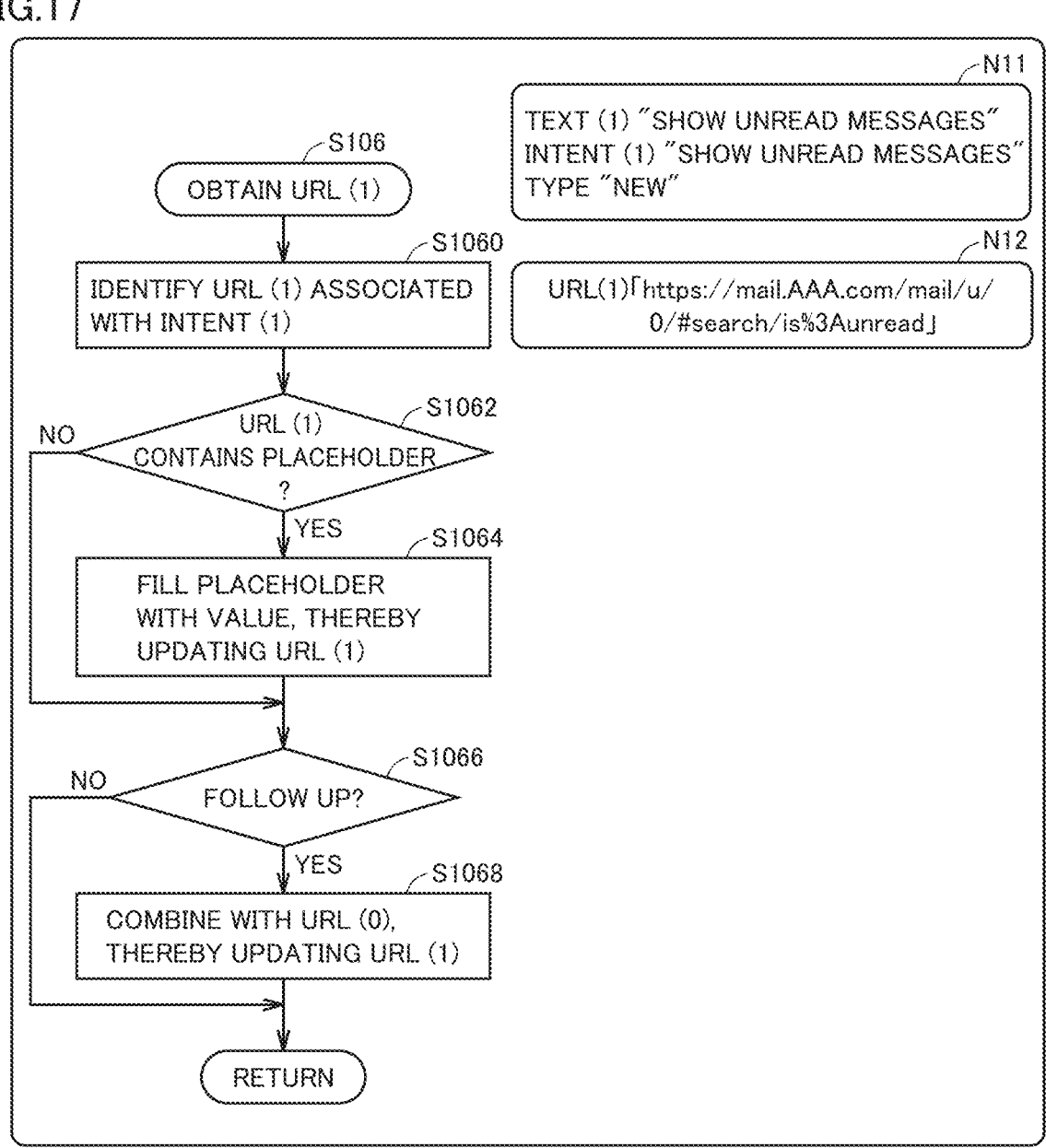
FIG. 17 is a diagram for illustrating a specific example 1 of a process of FIG. 16.

FIG. 17 is a diagram for illustrating a specific example 1 of the process of FIG. 16. FIG. 17 shows the flowchart of FIG. 16 with annotations N11, N12.

In the example of FIG. 17, the user inputs audio "show unread messages," as described in the annotation N11, while the screen 250 of FIG. 12 (the list of the messages in the inbox) is being displayed. The speech recognition unit 110 identifies a text "show unread messages" from this audio. The information processing unit 121 identifies a grammar "show unread messages" from this text.

The information processing unit 121 identifies an intent "show unread messages" from the grammar "show unread messages," as shown in FIG. 9. This intent is the "intent (1)" in step S1060.

The information processing unit 121 identifies an URL "https://mail.AAA.com/mail/u/0/#search/is%3Aunread" from the intent "show unread messages" (the intent (1)), as shown in FIG. 10. This URL is the "URL (1)" in step S1060, as described in the annotation N12.

The URL "https://mail.AAA.com/mail/u/0/#search/is%3Aunread" contains no placeholder. Accordingly, in the example of FIG. 17, the information processing unit 121 pass control from step S1062 to step S1066.

The type of the URL "https://mail.AAA.com/mail/u/0/#search/is%3Aunread" has a value of "new," not "follow up". Accordingly, in the example of FIG. 17, after step S1066, the information processing unit 121 returns control to FIG. 11, without performing step S1068. Due to this, according to the example of FIG. 17, in step S108 of FIG. 11, as the URL (1), the information processing unit 121 transmits to the user terminal 200 the URL "https://mail.AAA.com/mail/u/0/#search/is%3Aunread" identified in step S1060.

The URL "https://mail.AAA.com/mail/u/0/#search/is%3Aunread" is used to instruct the web server 900 to search the messages registered with the inbox of the web mail for unread messages. The browsing function 291 of the user terminal 200 uses this URL to access the web server 900, thereby causing the web server 900 to conduct the instructed search. The web server 900 then transmits to the browsing function 291 a web page (the screen) showing the search result. The browsing function 291 shows the web page (the screen) transmitted from the web server 900.

The screen 250C (FIG. 15) displayed by the URL "https://mail.AAA.com/mail/u/0/#search/is%3Aunread" shows unread messages among the messages registered with the inbox of the web mail.

8-2. Specific Example (2)

Figure 18:
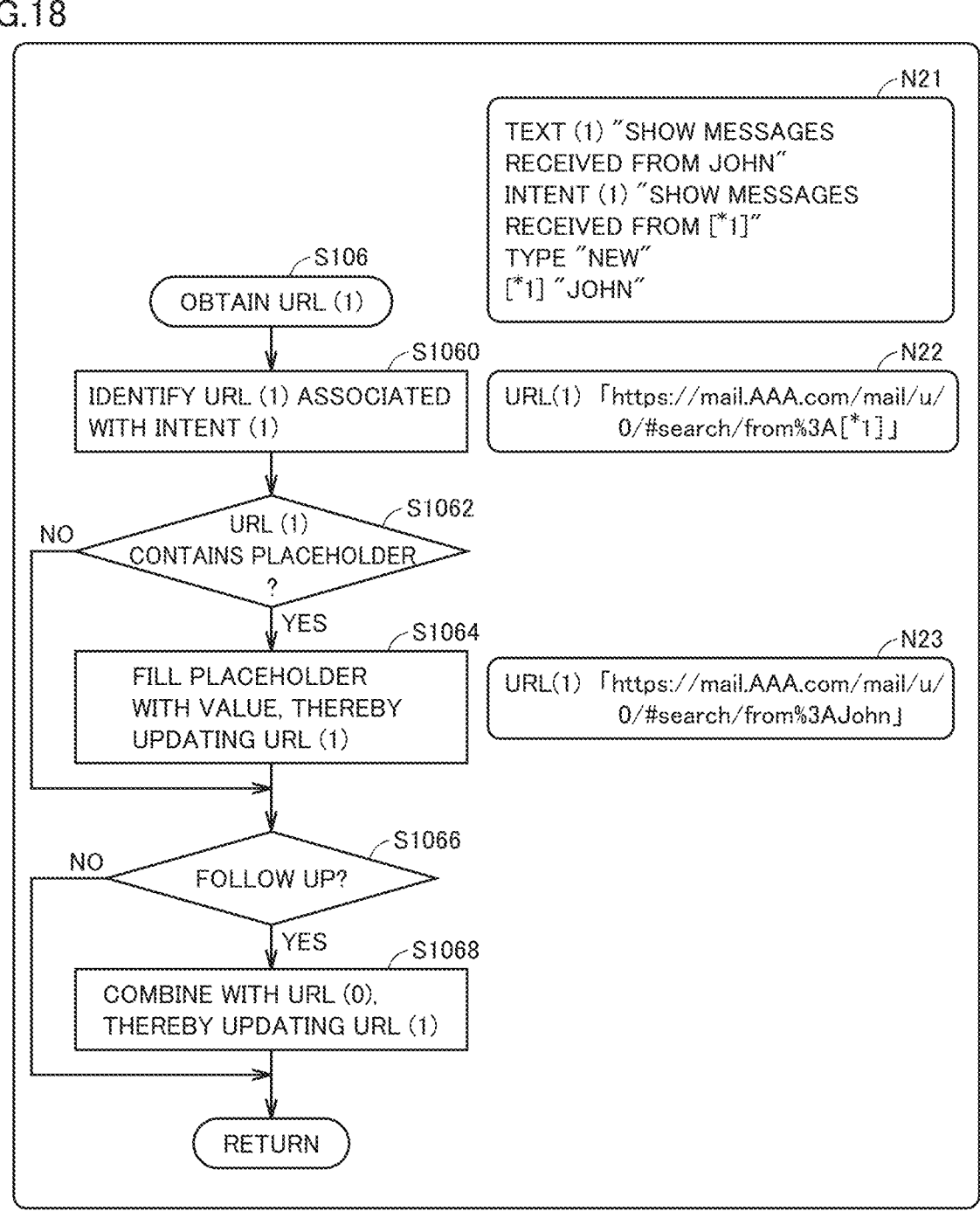
FIG. 18 is a diagram for illustrating a specific example 2 of the process of FIG. 16.

FIG. 18 is a diagram for illustrating a specific example 2 of the process of FIG. 16. FIG. 18 shows the flowchart of FIG. 16 with annotations N21, N22, N23.

In the example of FIG. 18, the user inputs audio "show the messages received from John," as described in the annotation N21, while the screen 250 of FIG. 12 (the inbox screen) is being displayed. The speech recognition unit 110 identifies a text "show the messages received from John" from this audio. The information processing unit 121 identifies a grammar "show the messages received from [*1]" from this text. The [*1] is a slot in this grammar.

The information processing unit 121 identifies an intent "show messages received from [*1]" from the grammar "show the messages received from [*1]," as shown in FIG.

9. This intent is the "intent (1)" in step S1060. In this intent, [*1] is a slot corresponding to the slot of the grammar.

The information processing unit 121 identifies an URL "https://mail.AAA.com/mail/u/0/#search/from%3A[*1]" from the intent "show messages received from [*1]" (the intent (1)), as shown in FIG. 10. This URL is the "URL (1)" in step S1060, as described in the annotation N22. In this URL, [*1] is a placeholder corresponding to the slot of the intent above.

The URL "https://mail.AAA.com/mail/u/0/#search/from%3A[*1]" contains a placeholder. Accordingly, in the example of FIG. 18, the information processing unit 121 passes control from step S1062 to step S1064.

In step S1064, the information processing unit 121 fills the placeholder above with the value of the slot ("John") in the intent above corresponding to the placeholder. This updates the URL (1) to "https://mail.AAA.com/mail/u/0/#search/from%3AJohn," as described in the annotation N23.

The type of the URL "https://mail.AAA.com/mail/u/0/#search/from%3A[*1]" has a value of "new," not "follow up." Accordingly, in the example of FIG. 18, after step S1066, the information processing unit 121 returns control to the process of FIG. 11, without performing step S1068. Due to this, according to the example of FIG. 18, in step S108 of FIG. 11, as the URL (1), the information processing unit 121 transmits to the user terminal 200 the URL "https://mail.AAA.com/mail/u/0/#search/from%3AJohn" updated in step S1064.

The URL "https://mail.AAA.com/mail/u/0/#search/from%3AJohn" is used to instruct the web server 900 to search the messages registered in the inbox of the web mail for the messages from the sender "John." The browsing function 291 of the user terminal 200 uses this URL to access the web server 900, thereby causing the web server 900 to conduct the instructed search. The web server 900 then transmits to the browsing function 291 a web page (the screen) showing the search result. The browsing function 291 shows the web page (the screen) transmitted from the web server 900.

8-3. Specific Example (3)

Figure 19:
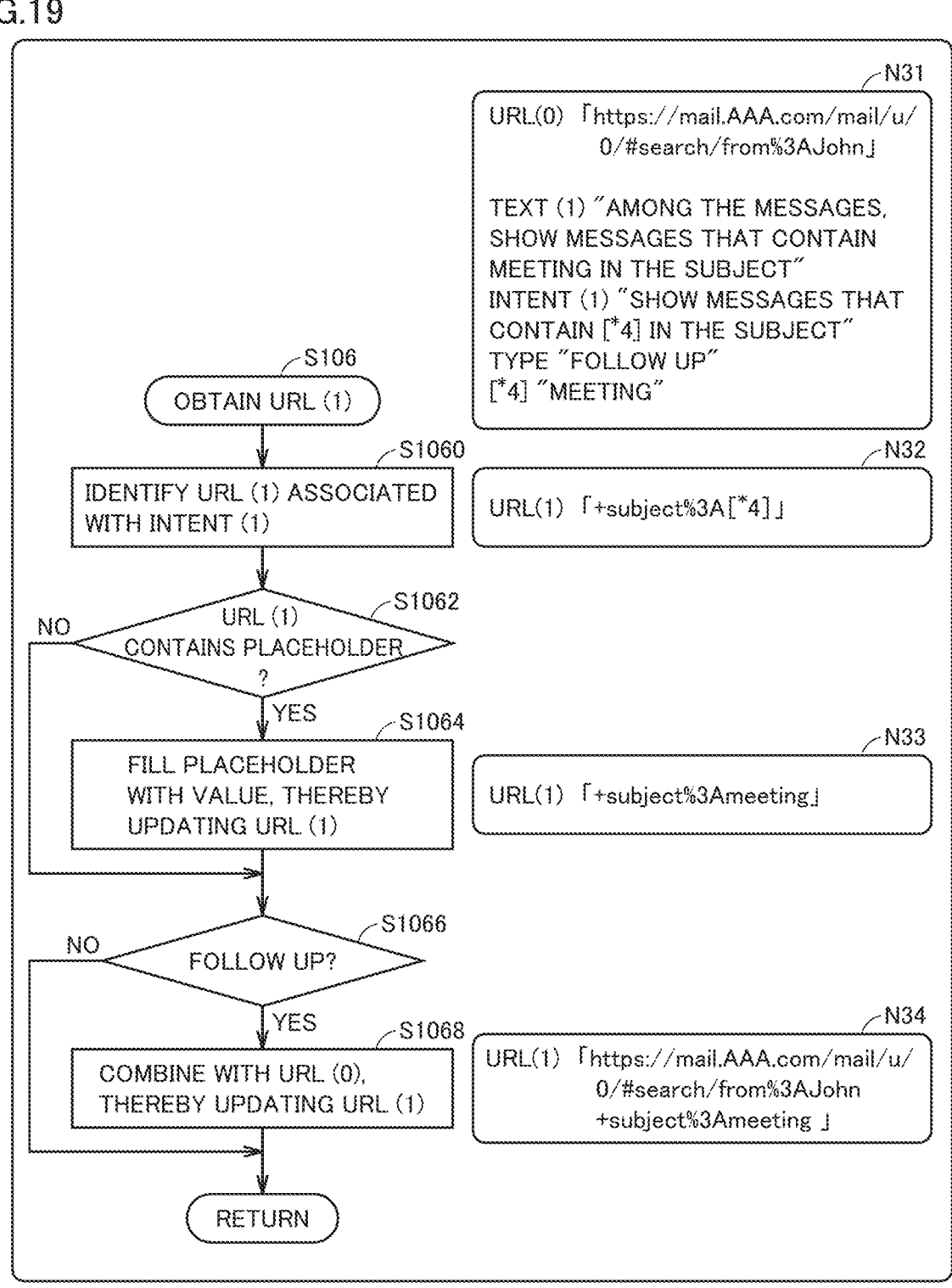
FIG. 19 is a diagram for illustrating a specific example 3 of the process of FIG. 16.

FIG. 19 is a diagram for illustrating a specific example 3 of the process of FIG. 16. FIG. 19 shows the flowchart of FIG. 16 with annotations N31, N32, N33, N34.

In the example of FIG. 19, the user inputs audio "among the messages, show messages that contain meeting in the subject," while the screen of the web page corresponding to the URL (0) is being displayed.

As described in the annotation N31, the URL (0) is "https://mail.AAA.com/mail/u/0/#search/from%3AJohn." This URL instructs searching for the messages from the sender "John," among the messages registered with the inbox of the web mail, as described with reference to FIG. 18. Accordingly, the screen of the web page corresponding to this URL is a screen showing a result of the search.

In the example of FIG. 19, the speech recognition unit 110 identifies a text "among the messages, show messages that contain meeting in the subject" from the audio "among the messages, show messages that contain meeting in the subject." The information processing unit 121 identifies a grammar "show messages that contain [*4] in the subject" from this text. The [*4] is a slot in the grammar. In the example of FIG. 19, the slot has a value of "meeting."

The information processing unit 121 identifies an intent "show messages that contain [*4] in the subject" from the grammar "show messages that contain [*4] in the subject,"

as shown in FIG. 9. This intent is the "intent (1)" in step S1060. In this intent, [*4] is a slot corresponding to the slot of the grammar.

The information processing unit 121 identifies the URL "+subject%3A[*4]" from the intent "show messages that contain [*4] in the subject" (the intent (1)), as shown in FIG. 10. This URL is the "URL (1)" in step S1060, as described in the annotation N32. In this URL, [*4] is a placeholder corresponding to the slot of the intent above.

The URL "+subject%3A[*4]" contains a placeholder. Accordingly, in the example of FIG. 19, the information processing unit 121 passes control from step S1062 to step S1064.

In step S1064, the information processing unit 121 fills the placeholder above with the value ("meeting") of the slot corresponding to the placeholder in the intent above. This updates the URL (1) to "+subject%3Ameeting," as described in the annotation N33.

The type of the URL "+subject%3A[*4]" has a value of "follow up." Accordingly, in the example of FIG. 19, after step S1066, the information processing unit 121 passes control to step S1068.

In step S1068, the information processing unit 121 combines the URL (1) with the URL (0), thereby updating the URL (1). This combines "+subject%3Ameeting" with "https://mail.AAA.com/mail/u/0/#search/from%3AJohn" to update the URL (1) to be "https://mail.AAA.com/mail/u/0/#search/from%3AJohn+subject%3Ameeting."

The information processing unit 121 then returns control to the process of FIG. 11. Due to this, according to the example of FIG. 19, in step S108 of FIG. 11, as the URL (1), the information processing unit 121 transmits to the user terminal 200 the URL "https://mail.AAA.com/mail/u/0/#search/from%3AJohn+subject%3Ameeting" updated in step S1068.

The URL "https://mail.AAA.com/mail/u/0/#search/from%3AJohn+subject%3Ameeting" instructs the web server 900 to search the messages registered with the inbox of the web mail for the messages whose sender is "John" and which contain "meeting" in the subject. The browsing function 291 of the user terminal 200 uses this URL to access the web server 900, thereby causing the web server 900 to conduct the instructed search. The web server 900 then transmits to the browsing function 291 a web page (the screen) showing the search result. The browsing function 291 shows the web page (the screen) transmitted from the web server 900.

In step S1068 of the specific example (3), the information processing unit 121 combines the URL (1) with URL (0), thereby updating the URL (1).

In this regard, in the example of FIG. 10, each intent, whose type has a value of "follow up," is associated with two URLs. One of the two URLs is not bracketed, while the other is bracketed.

For example, regarding the intent "show unread messages," the first URL is "+is%3Aunread," and the second URL is "/mail/u/0/#search/is%3Aunread." The first URL is used if the URL (URL (0)) obtained by the combination in step S1068 contains the string "/mail/u/0/#search/." The second URL is used if the URL (URL (0)) obtained by the combination in step S1068 does not contain the string "/mail/u/0/#search/." In other words, in the example of FIG. 10, the intents having "follow up" as the values of the types are each associated with multiple URLs. The information processing unit 121 can select a URL for use from among the multiple URLs, depending on a string contained in the URL (0).

9. Database Update

In the information providing system 1, the data structures of the grammar-intent database (FIG. 9) and/or the intent-URL database (FIG. 10) can be updated.

For example, a web server 900 newly joining the information providing system 1 may register with the language processing server 100 the information (updated content) identifying how each of one or more URLs for use in the web server 900 should be associated with respective one or more intents of the user. Upon receipt of such updated content from the web server 900, the language processing server 100 updates the intent-URL database in accordance with the updated content. Note that the updated content may be directly input to the language processing server 100 from the administrator of the information providing system 1.

Figure 20:
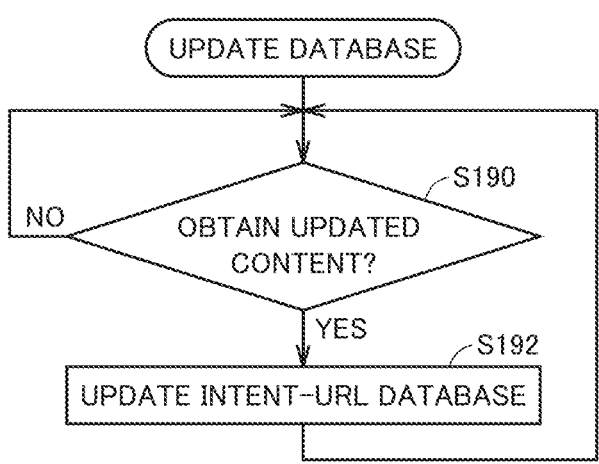
FIG. 20 is a flowchart of a process that is performed to update an intent-URL database.

FIG. 20 is a flowchart for the process that is performed to update the intent-URL database. The process of FIG. 20 can be implemented, for example, by the CPU 101 included in the language processing server 100 executing a given program.

As shown in FIG. 20, in step S190, the language processing server 100 determines whether the updated content is obtained. The language processing server 100 continues the control of step S190 (NO in step S190) until the language processing server 100 determines that the updated content is obtained. If the language processing server 100 determines that the updated content is obtained (YES in step S190), the language processing server 100 uses the updated content to update the intent-URL database (step S192).

Embodiment 2

1. Overview

Figure 21:
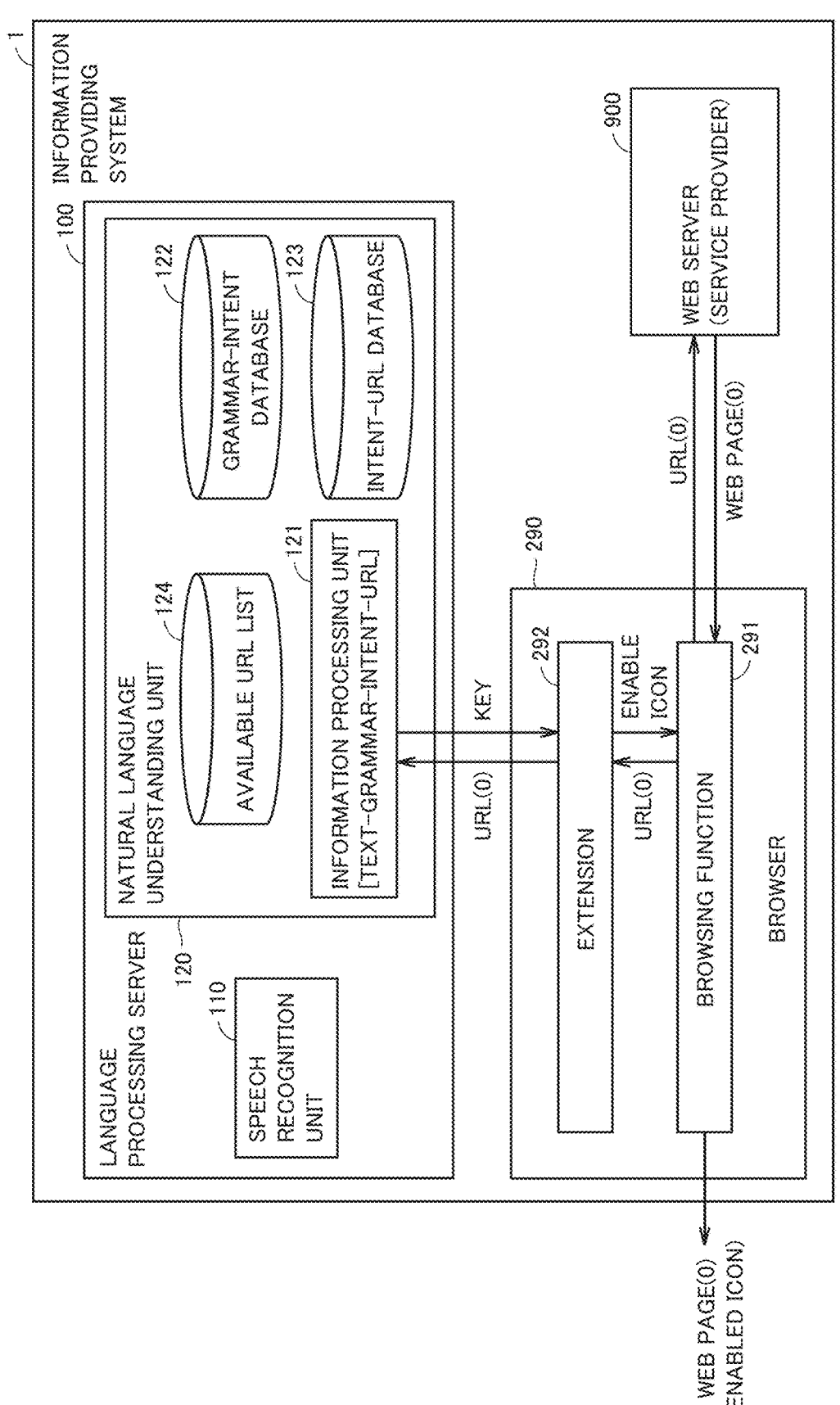
FIG. 21 is a diagram showing one example configuration of an information providing system according to Embodi-ment 2.

FIG. 21 is a diagram showing one example configuration of an information providing system according to Embodiment 2. In the example of FIG. 21, an available URL list 124 is registered with a language processing server 100. The available URL list 124 defines whether an extension 292 is to be enabled.

In Embodiment 2, in order to allow a user to use services, provided by a web server 900, together with the extension 292, the web server 900 is required to register with the available URL list 124 a URL (URL (0) described below) of a web page provided by the web server 900. The administrator of the information providing system 1 can request compensation, such as a fee, from the administrator of the web server 900 for the registration of the URL from the web server 900 with the available URL list 124.

2. Available URL List

FIG. 22 is a diagram showing one example data structure of the available URL list 124. The available URL list 124 is stored in a storage 103, for example.

As shown in FIG. 22, the available URL list 124 includes a list of URLs. In Embodiment 2, a browser 290 enables the extension 292 if the available URL list 124 contains the URL of the web page being displayed, otherwise, disables the extension 292.

One example of toggling between enabling/disabling the extension 292 is implemented by toggling between showing/hiding a microphone icon 252. The toggling between showing/hiding the microphone icon 252 is now described with reference to FIG. 21.

A browsing function 291 uses a URL (0) to access the web server 900, in response to which the web server 900 transmits a web page (0) corresponding to the URL (0) to the browsing function 291.

In contrast, the browsing function 291 sends the URL (0) to the extension 292. The extension 292 transmits the URL (0) to the language processing server 100.

The information processing unit 121 included in the language processing server 100 determines whether the available URL list 124 contains the URL (0). If the available URL list 124 contains the URL (0), the information processing unit 121 transmits a key (e.g., like a password) for showing the microphone icon 252 to the extension 292. In response to receiving the key, the extension 292 instructs the browsing function 291 to enable the microphone icon 252. In response to the instruction, the browsing function 291 shows the screen of the web page (0) and the microphone icon 252 on the display 202.

In contrast, if the available URL list 124 does not contain the URL (0), the information processing unit 121 does not transmit the key to the extension 292. If failed to receive the key, the extension 292 does not instruct the browsing function 291 to enable the microphone icon 252. In this case, the browsing function 291 shows the screen of the web page (0), without showing the microphone icon 252. In this case, the user is unable to use the extension 292 for obtaining a URL corresponding to the intent identified by the audio input. Accordingly, the user has to obtain an URL for gaining the intended service by a known method (e.g., inputting, at a pre-set location on the screen, conditions for searching the messages in the message list according to pre-set rules).

3. Process Flow

Figure 23:
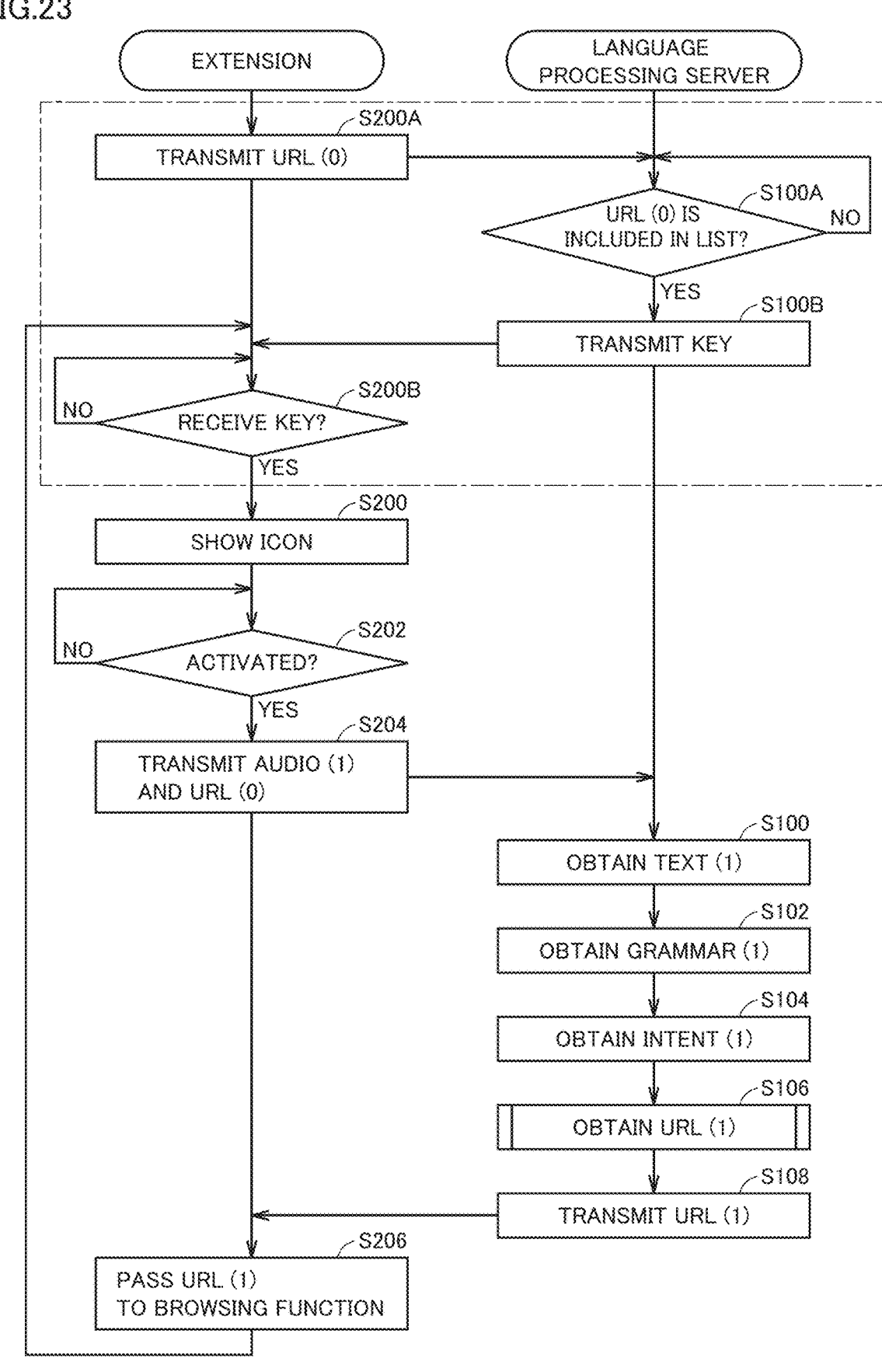
FIG. 23 is a flowchart of a variation of the process of FIG. 11.

FIG. 23 is a flowchart of a variation of the process of FIG. 11. Compared to the example of FIG. 11, the example of FIG. 23 further includes steps S200A, S200B and steps S100A, S100B.

More specifically, in step S200A, the extension 292 transmits the URL (0) received from the browsing function 291 to the language processing server 100.

In step S100A, as a function of the information processing unit 121, the language processing server 100 determines whether the URL (0) received from the extension 292 is included in the available URL list 124. If determined that the URL (0) is included in the available URL list 124 (YES in step S100A), the language processing server 100, in step S100B, transmits the key above to the extension 292. If determined otherwise (NO in step SS100A), the language processing server 100 repeats the control of step S100A.

In step S200B, the extension 292 determines whether the extension 292 receives the key from the language processing server 100. The extension 292 repeats the control of step S200B (NO in step SS200B) until determining that the extension 292 receives the key above. If determined that the extension 292 receives the key above (YES in step S200B), the extension 292 passes control to step S200.

In Embodiment 2, the browsing function 291 may show the screen corresponding to the web page (0) on the display 202, without the microphone icon 252, concurrently with transmitting the URL (0) to the extension 292, and then add the microphone icon 252 to the screen in response to the instruction from the extension 292 for showing the microphone icon 252 (S200).

In the process of FIG. 23, if the extension 292 receives a new URL from the browsing function 291 while waiting for a key from the language processing server 100 in step S200B, the extension 292 may return control to step S200A.

4. Variation

Figure 24:
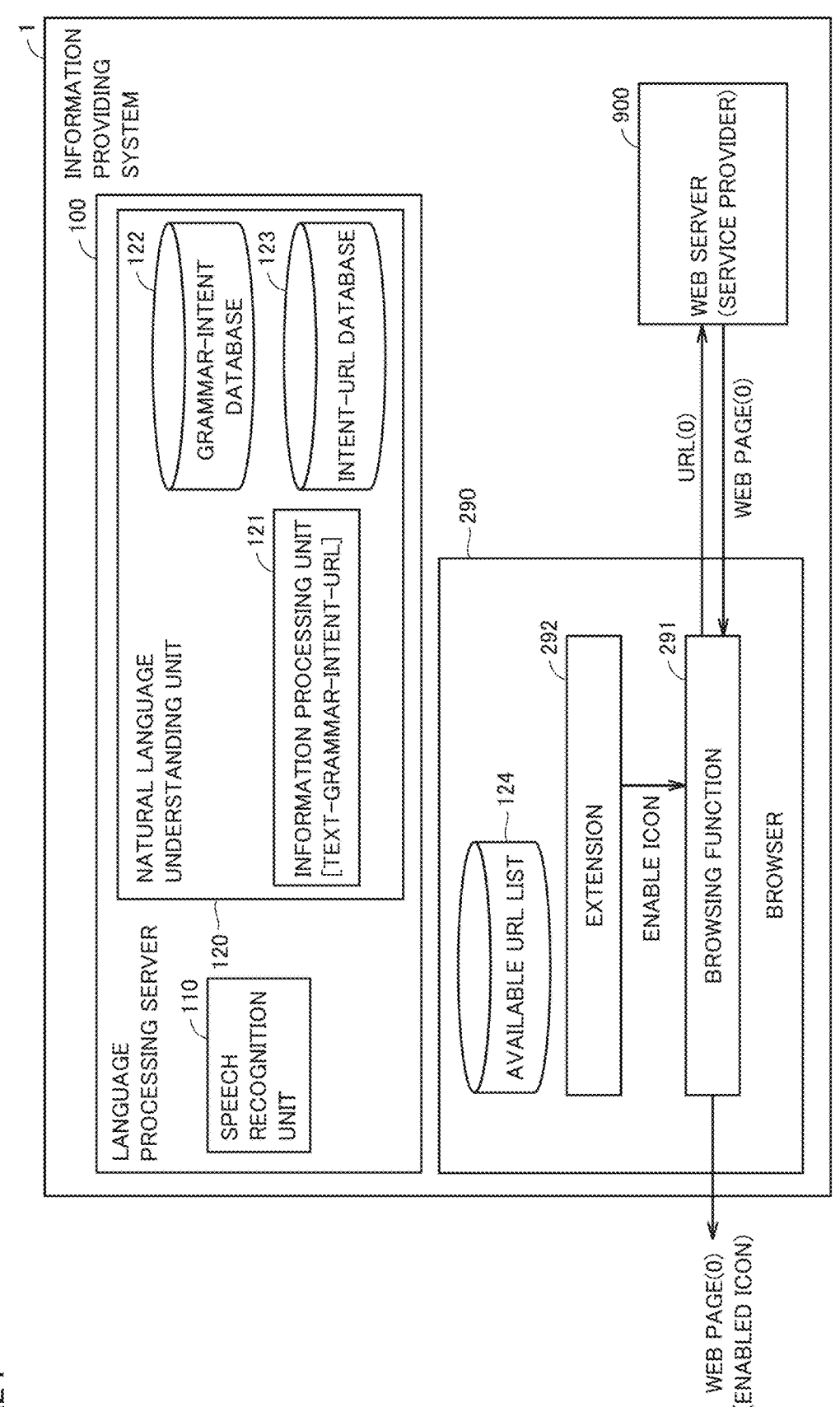
FIG. 24 is a diagram showing a configuration of Variation of the information providing system 1 according to Embodiment 2.

FIG. 24 is a diagram showing a configuration of Variation of the information providing system 1 according to Embodiment 2. In the example of FIG. 24, the available URL list 124 is stored in the browser 290 (a user terminal 200).

Figure 25:
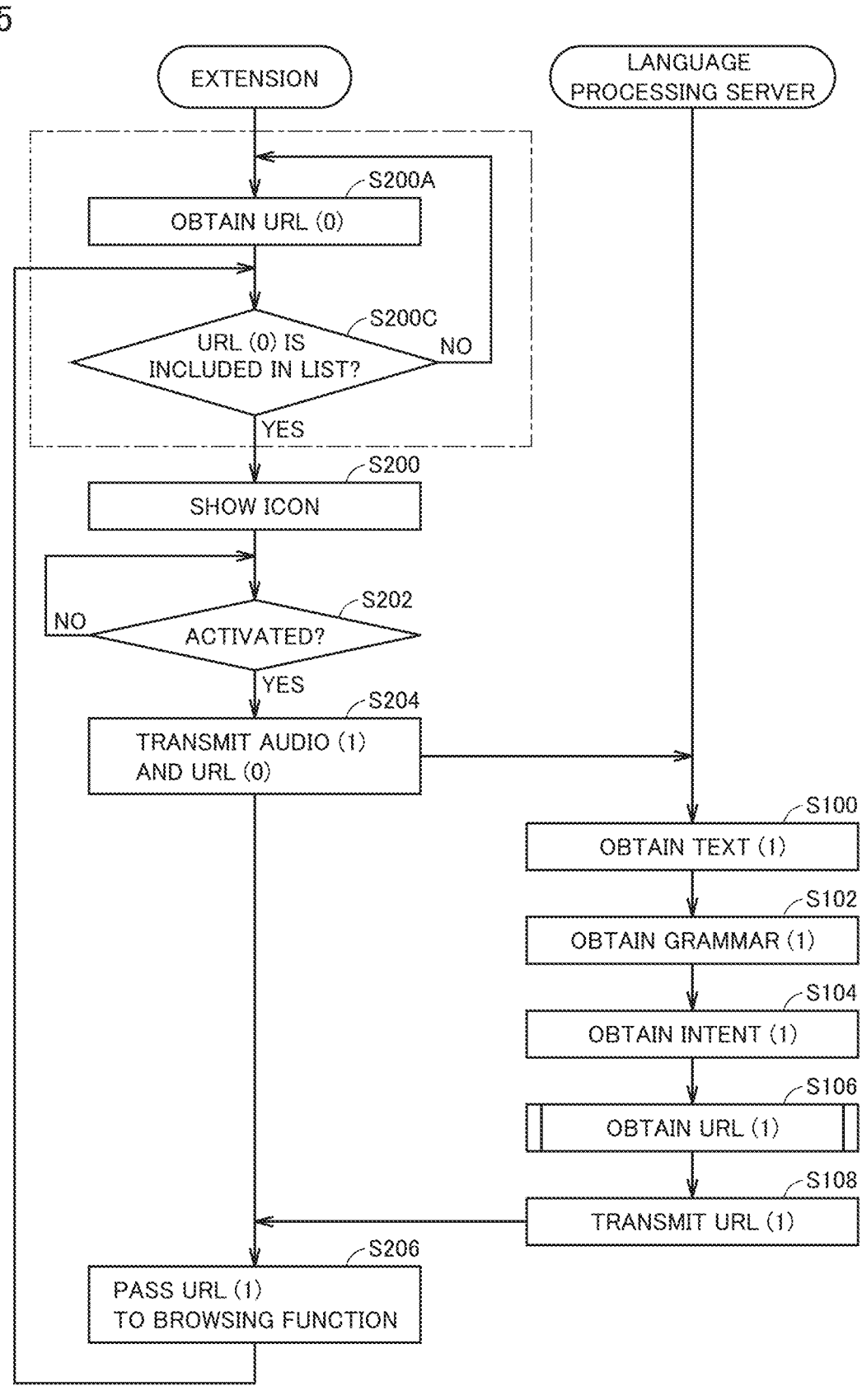
FIG. 25 is a flowchart of a variation of the process of FIG. 11 that conforms to an example of FIG. 24.

FIG. 25 is a flowchart of a variation of the process of FIG. 11 that conforms to the example of FIG. 24. Compared to the process of FIG. 11, the process of FIG. 25 further includes steps S200A, S200C.

In the process of FIG. 25, in step S200A, the extension 292 obtains a URL (0) from the browsing function 291.

In step S200C, the extension 292 determines whether the URL (0) is included in the available URL list 124. If determined that the URL (0) is included in the available URL list 124 (YES in step S200C), the extension 292 passes control to step S200. Otherwise (NO in step SS200C), the extension 292 returns control to step S200A.

Embodiment 3

Figure 26:
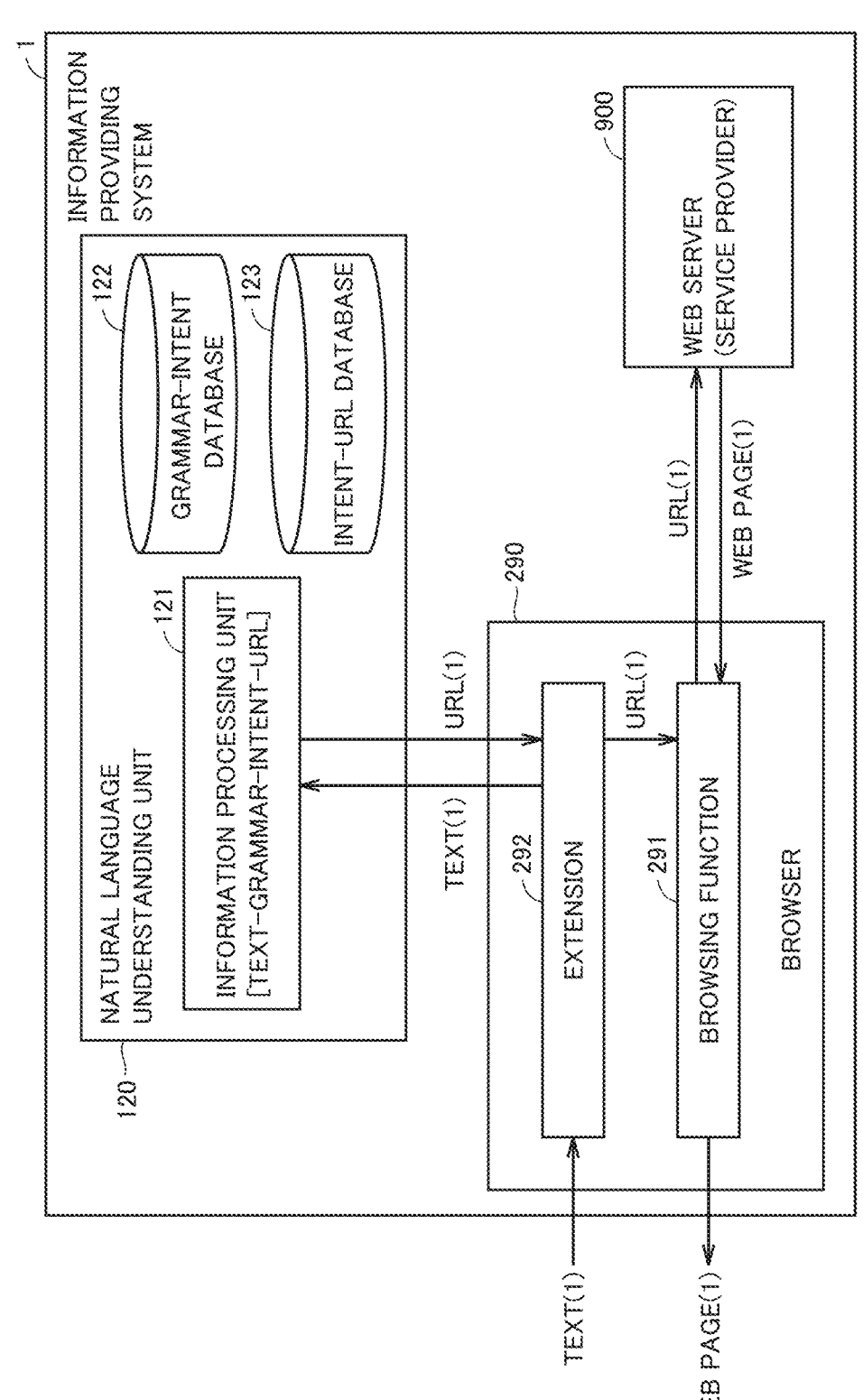
FIG. 26 is a diagram showing one example configuration of an information providing system according to Embodiment 3.

FIG. 26 is a diagram showing one example configuration of an information providing system according to Embodiment 3. In Embodiment 3, a user inputs a text to a browser 290, instead of audio. In one example, inputting the text to the browser 290 is implemented by inputting the text to an input field 261 (FIG. 13) and clicking on a query button 262 (FIG. 13). An extension 292 transmits the text input to the browser 290 to an information processing unit 121.

The information processing unit 121 identifies a grammar conforming to the text received from the extension 292, rather than a grammar conforming to the text received from the speech recognition unit 110. In other words, in the example of FIG. 26, a language processing server 100 is not required to have a speech recognition unit 110.

Embodiment 4

Figure 27:
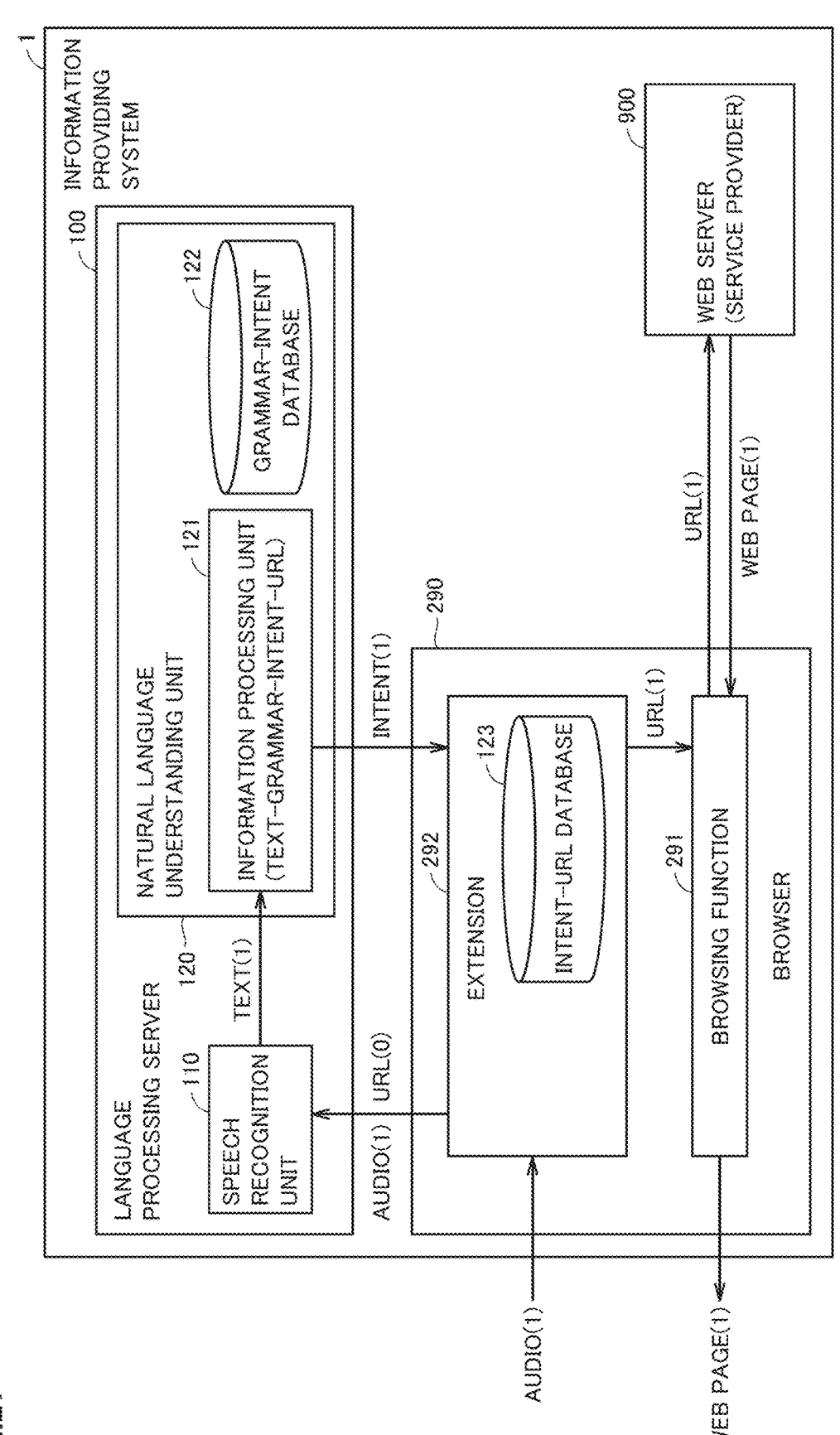
FIG. 27 is a diagram showing one example configuration of an information providing system according to Embodiment 4.

FIG. 27 is a diagram showing one example configuration of an information providing system according to Embodiment 4. In Embodiment 4, an intent-URL database 123 is stored in a user terminal 200, as a part of an extension 292.

In the example of FIG. 27, Upon receipt of audio from a user, the extension 292 transmits the audio (audio (1)) to a language processing server 100. In the language processing server 100, a speech recognition unit 110 identifies a text (1) corresponding to the audio (1), and transmits the text (1) to an information processing unit 121.

The information processing unit 121 identifies a grammar (a grammar (1)) conforming to the text (1), identifies an intent (an intent (1)) corresponding to the identified grammar (1), and transmits the identified intent to the extension 292.

The extension 292 references to an intent-URL database 123, thereby identifying a URL (a URL (1)) corresponding to the intent received from the information processing unit 121. The extension 292 then passes the URL (1) to a browsing function 291. This allows the browsing function 291 to use the URL (1) to access a web server 900.

The web server 900 transmits a web page (a web page (1)) corresponding to the URL (1) to the browsing function 291. The browsing function 291 shows a screen corresponding to the web page (1) on a display 202.

Embodiment 5

Figure 28:
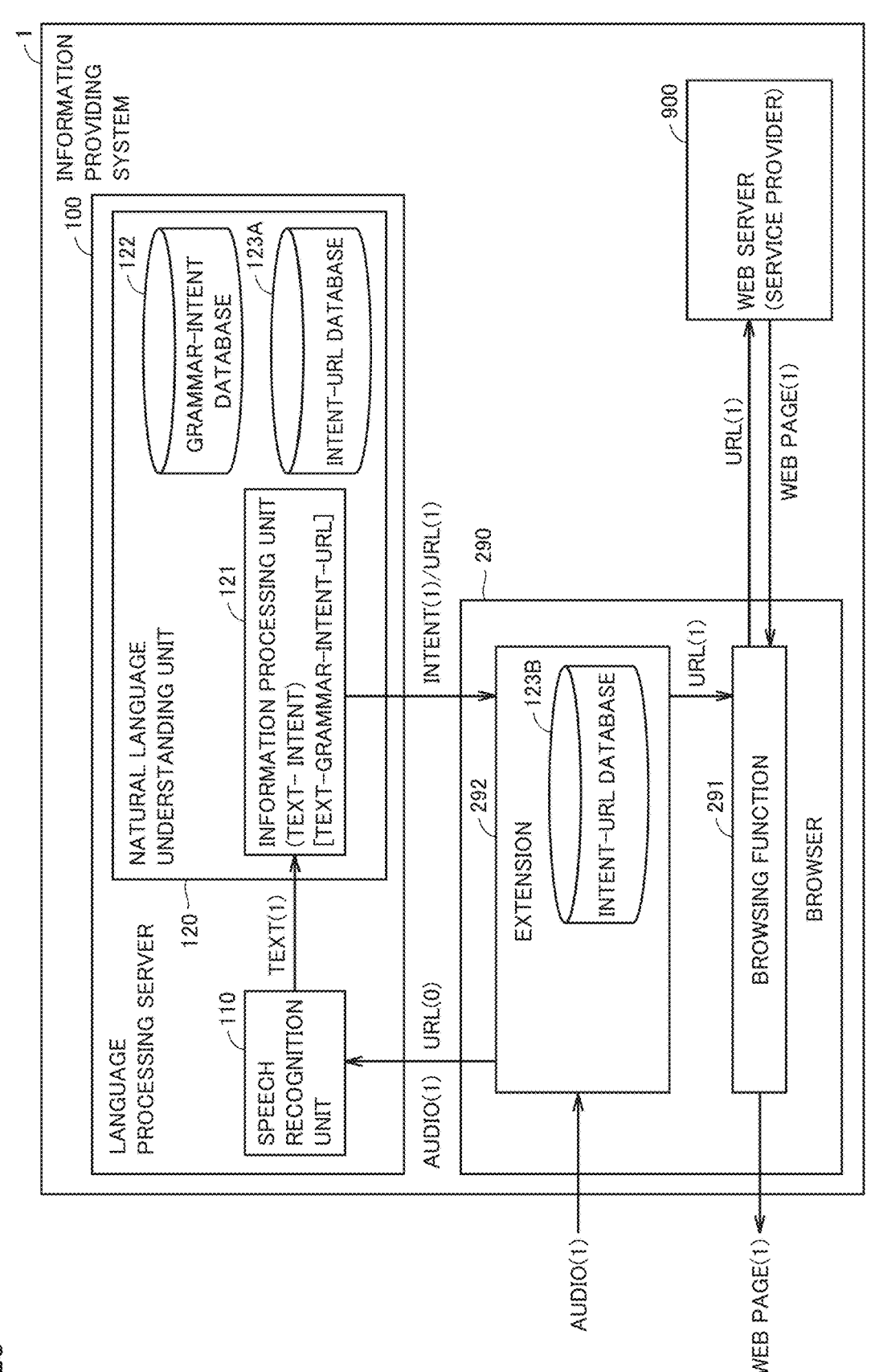
FIG. 28 is a diagram showing one example configuration of an information providing system according to Embodiment 5.

FIG. 28 is a diagram showing one example configuration of an information providing system according to Embodiment 5. In the example of FIG. 28, a natural language understanding unit 120 includes an intent-URL database 123A, and an extension 292 includes an intent-URL database 123B. In the example of FIG. 28, some intents among all the intents are associated with URLs in the intent-URL database 123B, and the rest of the intents are associated with URLs in the intent-URL database 123A.

More specifically, an information processing unit 121 identifies a grammar (1) conforming to the text (1) received from a speech recognition unit 110, and identifies an intent (1) corresponding to the grammar (1). The information processing unit 121 then determines whether the intent (1) is included in the "some intents" above.

If the intent (1) is included in the "some intents" above, the information processing unit 121 transmits the intent (1) to the extension 292. In this case, the extension 292 identifies a URL (1) corresponding to the intent (1) in the intent-URL database 123B.

In contrast, if the intent (1) is not included in the "some intents" above, the information processing unit 121 identifies the URL (1) corresponding to the intent (1) in the intent-URL database 123A, and transmits the URL (1) to the extension 292.

Embodiment 6

Figure 29:
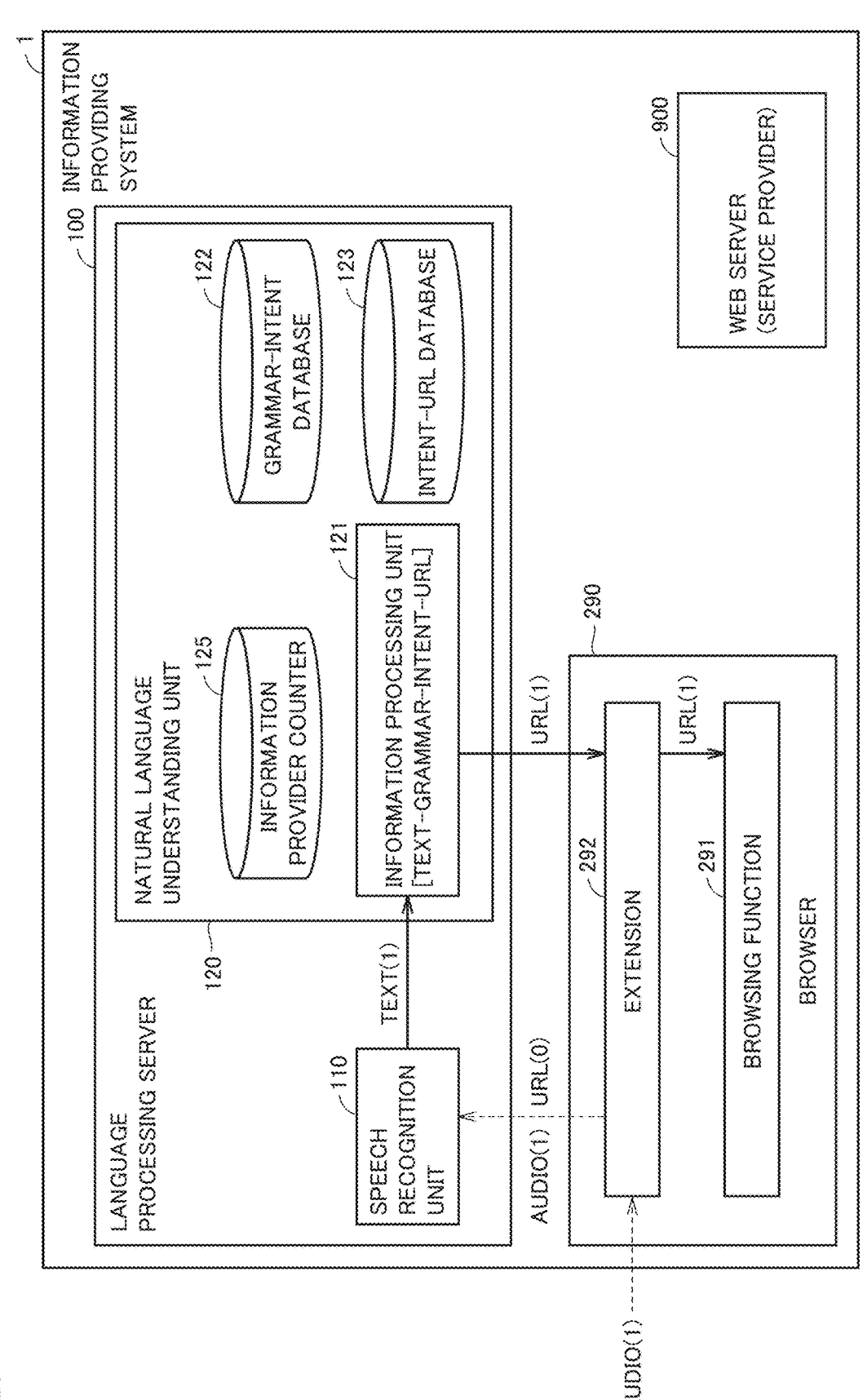
FIG. 29 is a diagram showing one example configuration of an information providing system according to Embodiment 6.

FIG. 29 is a diagram showing one example configuration of an information providing system according to Embodiment 6. In the example of FIG. 29, a natural language understanding unit 120 further includes an information provider counter 125.

FIG. 30 is a diagram showing one example data structure of an intent-URL database 123 in the example of FIG. 29. In the intent-URL database 123, each URL is associated with a service provider. In the example of FIG. 30, the URLs are all associated with a service provider "company AAA."

FIG. 31 is a diagram showing one example data structure of an information provider counter 125. The information provider counter 125 stores the number of times the URL of each service provider is provided to a browsing function 291. For example, the example of FIG. 31 represents that in January 2021, the URL of the company AAA is provided to the browsing function 291 205 times and the URL of a company BBB is provided to the browsing function 291 ten times.

In one implementation, in step S108 (FIG. 11), each time an information processing unit 121 transmits a URL to the extension 292, the information provider counter 125 increments the counter for a service provider that is associated with the URL by 1.

For example, for every month, the administrator of the language processing server 100 may charge each service provider for compensation in accordance with the count value by the information provider counter 125 of the month.

Note that the information provider counter 125 may be included in the extension 292, rather than the natural language understanding unit 120. In this case, each time the extension 292 passes a URL to the browsing function 291, the extension 292 may increments the count for the service provider associated with the passed URL by 1.

Embodiment 7

1. Overview

Figure 32:
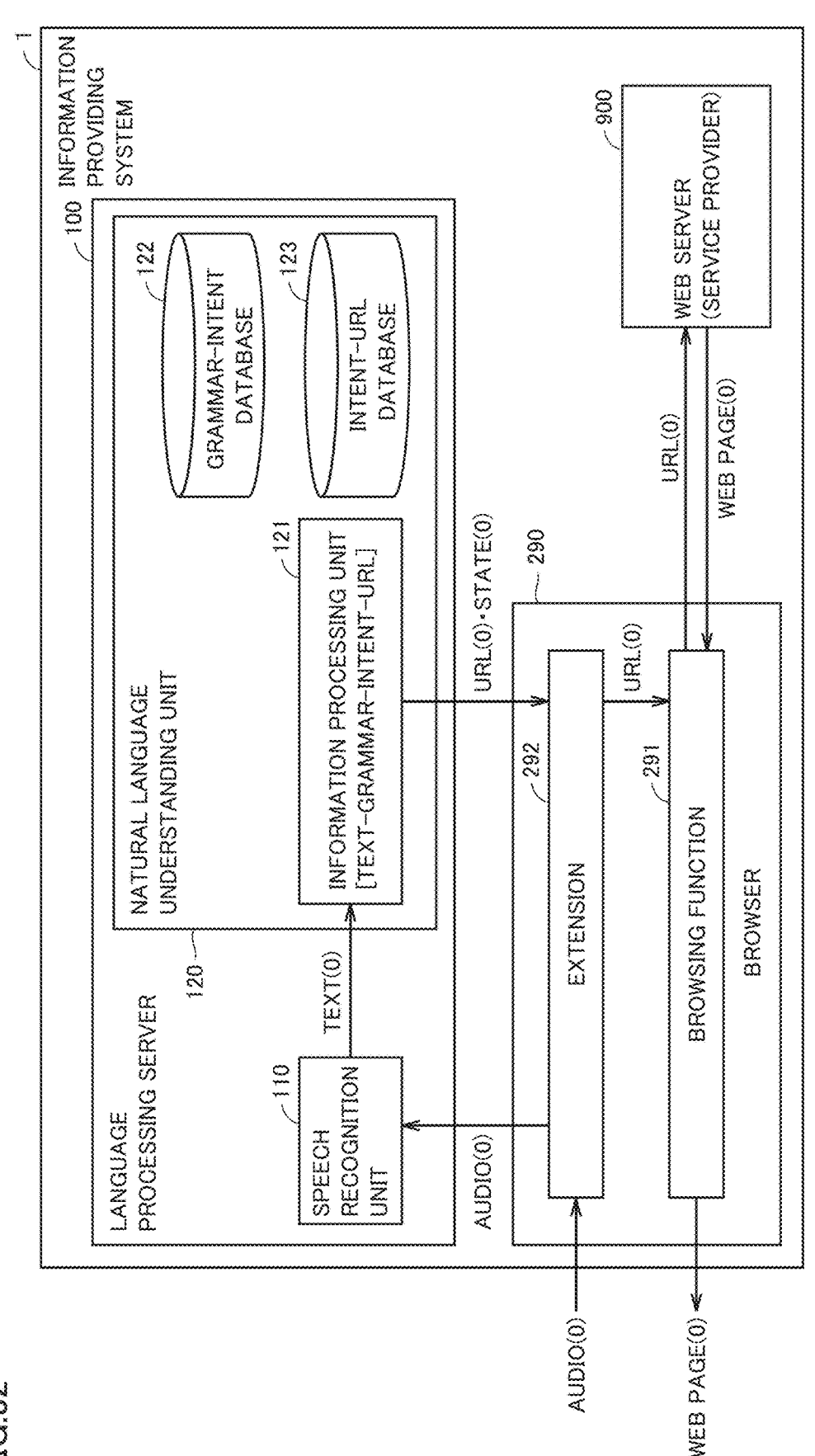
FIG. 32 is a diagram showing one example configuration of an information providing system according to Embodiment 7.

FIG. 32 is a diagram showing one example configuration of an information providing system according to Embodiment 7. In Embodiment 7, for the identification of a URL (1), a conversation state is used, instead of URL (0). The conversation state represents a status of a browser 290 at the time a user inputs audio to identify a URL (1). The conversation state can also be a state corresponding to the URL (0).

2. Conversation State

In one implementation, the conversation state includes an intent used to obtain the URL (0). If the intent includes a slot, the conversation state further includes a value of the slot (the value filled in a placeholder) used to obtain the URL (0).

For example, the URL "https://mail.AAA.com/mail/u/0/#search/from%3AJohn" is obtained when the intent "show messages received from [*1]" is identified as an intent corresponding to the audio input by the user. More specifically, the URL "https://mail.AAA.com/mail/u/0/#search/from%3AJohn" is obtained by a URL "https://mail.AAA.com/mail/u/0/#search/from%3A[*1]," associated with the intent above in the intent-URL database, being filled with a value "John" of the slot. In this case, the conversation state corresponding to the URL "https://mail.AAA.com/mail/u/0/#search/from%3AJohn" includes the intent "show messages received from [*1]" and the value "John."

3. Process Overview

Figure 33:
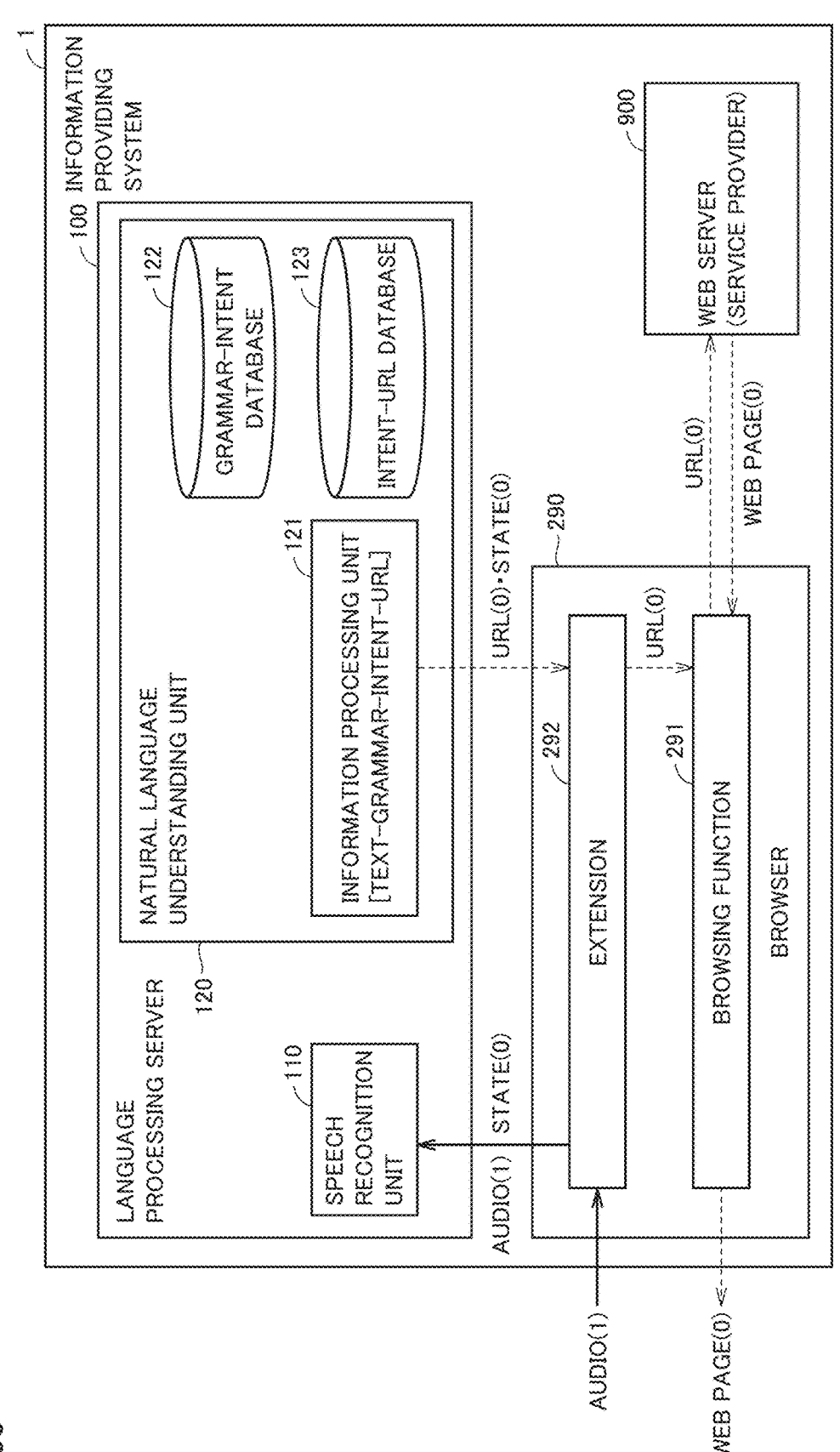
FIG. 33 is a diagram showing an overview of a process according to Embodiment 7.
Figure 34:
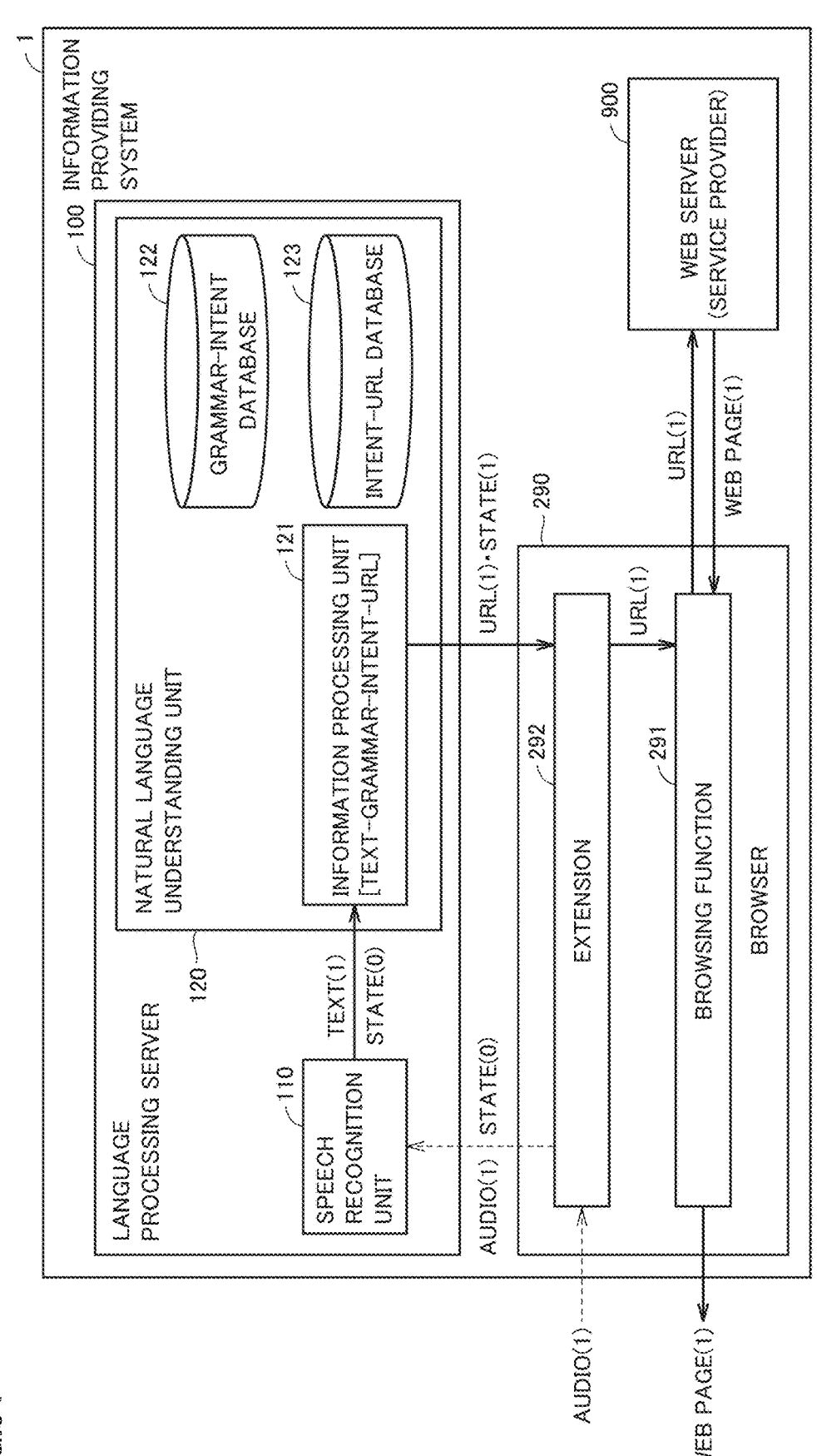
FIG. 34 is a diagram showing an overview of the process according to Embodiment 7.

FIGS. 33 and 34 are each a diagram showing an overview of a process according to Embodiment 7. Referring to FIGS. 32 to 34, the overview of the process according to Embodiment 7 is now described.

In the example of FIG. 32, an extension 292 obtains audio (0), and transmits the audio (0) to a language processing server 100. In the language processing server 100, a speech recognition unit 110 identifies a text (0) corresponding to the audio (0), and transmits the text (0) to a natural language understanding unit 120. In the natural language understanding unit 120, an information processing unit 121 identifies a grammar (0) conforming to the text (0), identifies an intent (0) corresponding to the grammar (0), and obtains a URL (0) corresponding to the intent (0). At this time, the information processing unit 121 generates a conversation state (a state (0)) corresponding to the URL (0). The information processing unit 121 transmits the URL (0) and the state (0) to the extension 292.

The extension 292 passes the URL (0) to a browsing function 291. The browsing function 291 uses the URL (0) to access a web server 900, thereby obtaining a web page (0) and showing a screen of the web page (0) on a display 202.

In FIG. 33, audio (1) is input to the extension 292 while the screen of the web page (0) is being displayed. Upon receipt of the audio (1), the extension 292 transmits the audio (1) and the conversation state (the state (0)) at that time to the language processing server 100.

FIG. 34 shows a process after the audio (1) and the state (0) are input to the language processing server 100.

In the language processing server 100, the speech recognition unit 110 identifies a text (1) corresponding to the audio (1). The speech recognition unit 110 then transmits the text (1) and the state (0) to the natural language understanding unit 120.

In the natural language understanding unit 120, the information processing unit 121 identifies a grammar (a grammar (1)) conforming to the text (1) and identifies an intent (an intent (1)) corresponding to the grammar (1), and thereafter obtains a URL (a URL (1)) corresponding to the intent (1). The state (0) is used to obtain the URL (1), as needed. A use aspect of the state (0) will be described below with reference to FIG. 37, etc.

The information processing unit 121 also uses the text (1) and the grammar (1) to generate a conversation state (a state (1)) corresponding to the URL (1).

The information processing unit 121 transmits the URL (1) and the state (1) to the extension 292. The extension 292 passes the URL (1) to the browsing function 291.

As audio is input to the extension 292 while the screen of a web page (1) corresponding to the URL (1) is being displayed, the extension 292 may transmit the audio and the state (1) to the language processing server 100.

4. Grammar-Intent Database

FIG. 35 is a diagram showing a variation of a grammar-intent database 122. In the example of FIG. 35, the grammar-intent database 122 further includes a grammar "how about [*8]?" whose type has a value of "special follow up." In the example of FIG. 35, the intent associated with the grammar "how about [*8]?" is defined as an intent that is identified by a conversation state.

5. Process Flow

Figure 36:
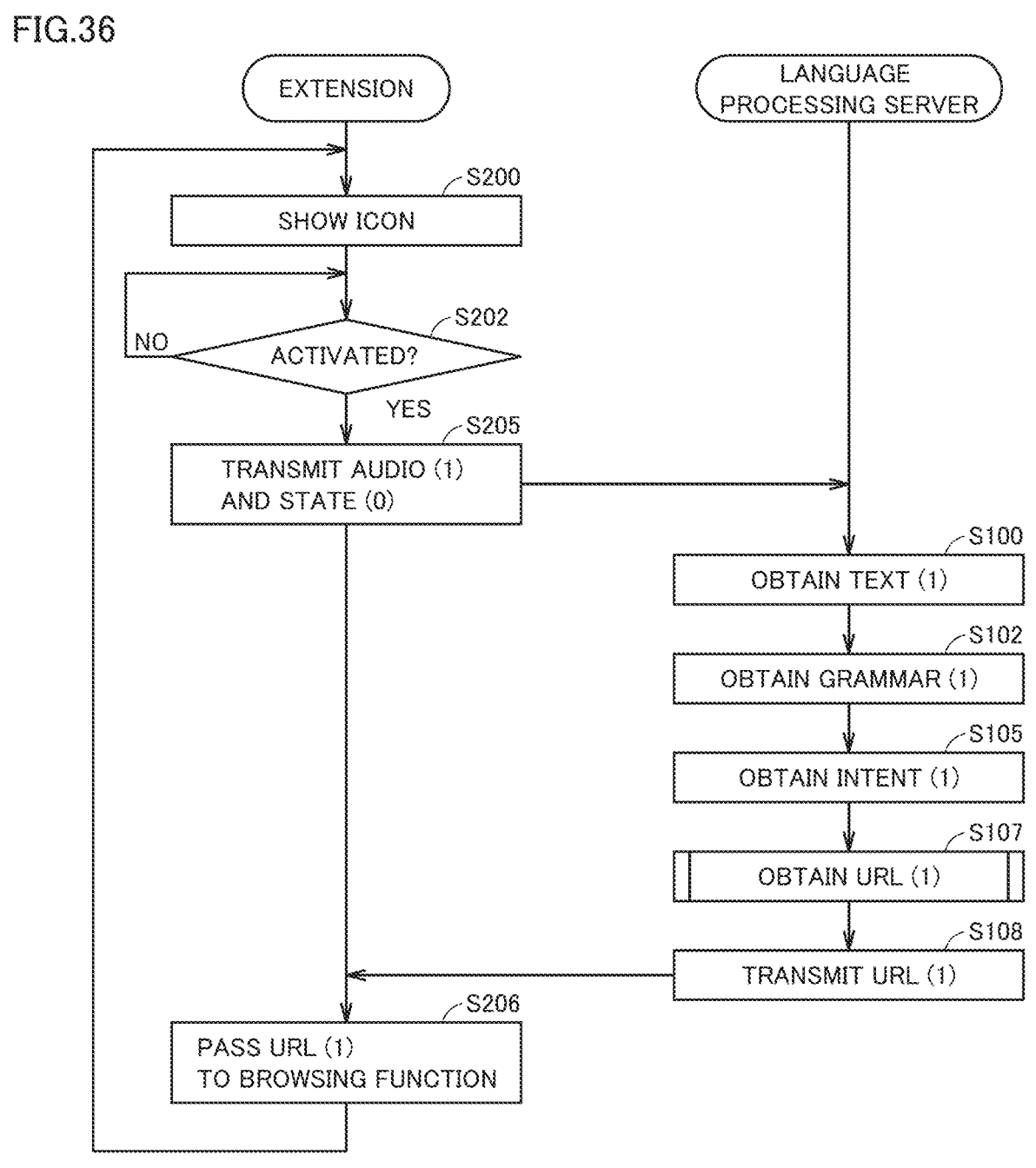

FIG. 36 is a flowchart of a variation of the process of FIG. 11. The example of FIG. 36 includes step S205, instead of step S204, and steps S105, S107, instead of steps S104, S106.

In step S205, the extension 292 transmits an input audio (the audio (1)) and a conversation state (the state (0)) at that time to the language processing server 100.

In step S105, as a function of the information processing unit 121, the language processing server 100 identifies an intent (the intent (1)) of the text (1). Note that if the type of the grammar conforming to the text (1) has a value of "special follow up," the intent (the intent (0)) identified in the state (0) is identified as the intent (1). In other words, the intent (1) is the intent (0). In one example, the intent identified for the audio input immediately previous to the presently input audio is used as the intent of the presently input audio.

In step S107, as a function of the information processing unit 121, the language processing server 100 obtains the URL (1) corresponding to the text (1).

Figure 37:
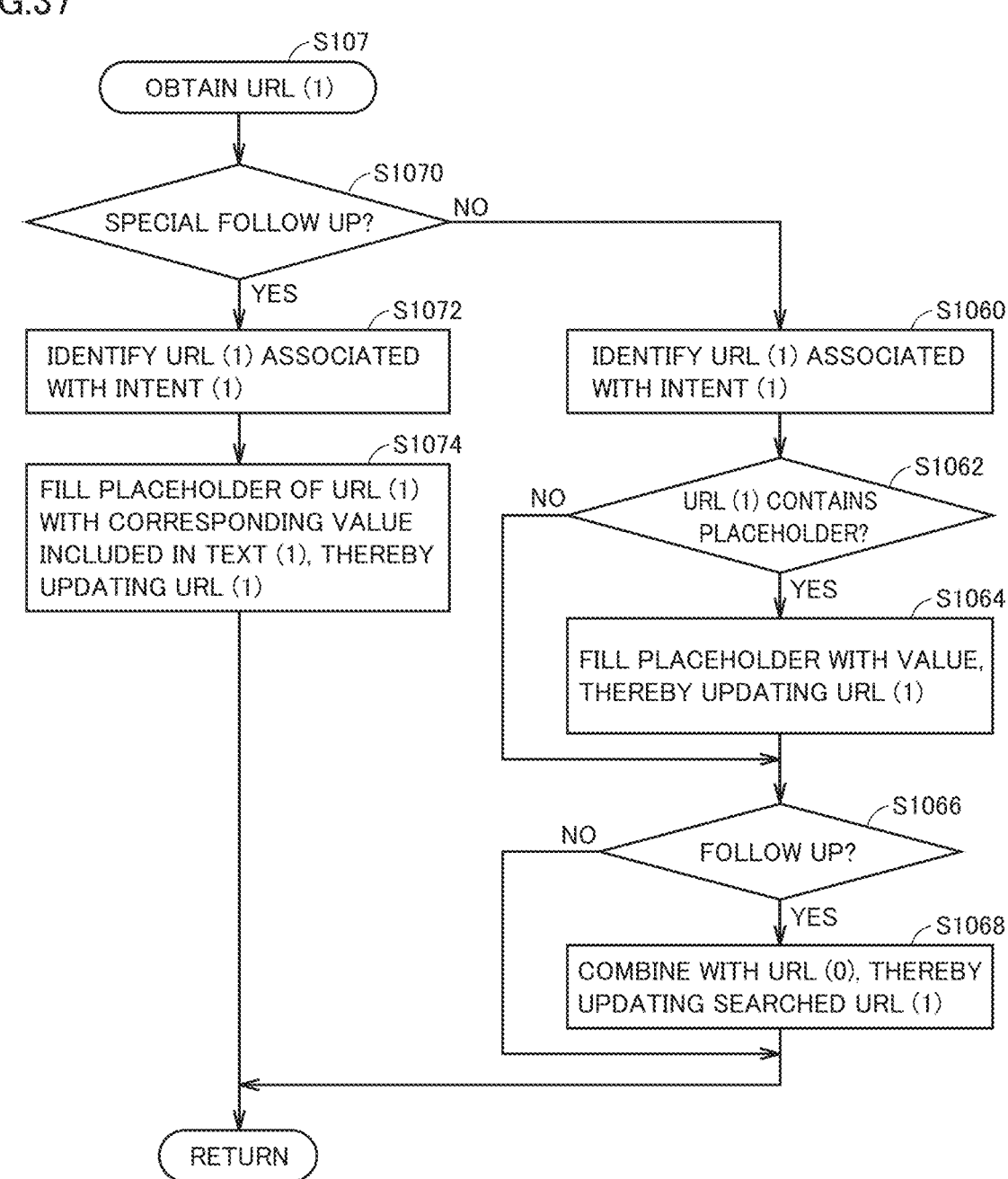
FIG. 37 is a flowchart of a sub routine of step S107.

FIG. 37 is a flowchart of a sub routine of step S107. Compared to the process of FIG. 16, the process of FIG. 37 further includes steps S1070, S1072, S1074.

In step S1070, the language processing server 100 determines whether the type of the grammar (1) has a value of special follow up. If determined that the type of the grammar (1) has a value of special follow up (YES in step S1070), the language processing server 100 passes control to step S1072. Otherwise (NO in step S1070), the language processing server 100 passes control to step S1060.

In step S1072, the language processing server 100 identifies a URL (1) associated with the intent (1).

In step S1074, the language processing server 100 fills a placeholder of the URL (1), identified in step S1072, with a value of the slot included in the text (1), thereby updating the URL (1). Then, the language processing server 100 returns control to the process of FIG. 36.

6. Specific Example

A specific example of updating the URL (1) in step S1074 is now described.

In this specific example, audio "how about Sue?" is input when the screen is displayed for the web page of the URL "https://mail.AAA.com/mail/u/0/#search/from%3AJohn." In other words, the URL (0) is "https://mail.AAA.com/mail/u/0/#search/from%3AJohn," and the audio (1) is "how about Sue?" In this case, as with the audio (1), the text (1) is "how about Sue?"

Web Page (0)

The web page displayed by the URL "https://mail.AAA.com/mail/u/0/#search/from%3AJohn" is a web page showing a search result for the messages from the sender "John" in the inbox of the web mail.

State (0)

The conversation state (the state (0)) at the time of input of the audio (1), corresponds to the URL "https://mail.AAA.com/mail/u/0/#search/from%3AJohn." The conversation state (the state (0)) of this URL includes the intent "show messages received from [*1]" and the value "John," as described above.

Intent (0)

The intent (0) identified by the state (0) is the intent (0) included in the state (0), which is the intent "show messages received from [*1]," as described above.

Value of Slot Included in Text (1)

The text "how about Sue?" conforms to the grammar "how about [*8]?" The slot [*8] has a value of "Sue." This value is filled in the URL (1) as a value corresponding to a placeholder of the URL (1).

Step S1070

The type of the grammar "how about [*8]?" has a value of "special follow up." Accordingly, control is passed from step S1070 to step S1072.

Step S1072

The URL identified in step S1072 is the URL associated with the intent (1) (the intent "show messages from [*1]"), that is, the URL "https://mail.AAA.com/mail/u/0/#search/from%3A[*1]."

Step S1074

In step S1074, a placeholder of the URL (1) is filled with the value of the slot included in the text (1), and the URL (1) is thereby updated. More specifically, [*1] in the URL "https://mail.AAA.com/mail/u/0/#search/from%3A[*1]" is filled with "Sue" and this URL is thereby updated. The updated URL (1) is "https://mail.AAA.com/mail/u/0/#search/from%3ASue."

According to the specific example described above, as the user inputs "show the messages from John" as the audio (0), the screen of the web page for the URL "https://mail.AAA.com/mail/u/0/#search/from%3AJohn" is displayed. The screen shows a result of search for the messages from John. If the user inputs "how about Sue?" as the audio (1) while the screen is being displayed, the screen for the web page of the URL "https://mail.AAA.com/mail/u/0/#search/from%3ASue" is displayed. The screen shows a result of search for the messages from Sue.

7. Variation

The conversation state (the state (0)) corresponding to the URL (0) may be obtained based on the URL (0). In this case, initially, a URL that has most common portions with the URL (0) is selected from among one or more URLs registered with the intent-URL database. A conversation state (the state (0)) is then identified which includes an intent associated with the selected URL and a value filled in a placeholder of the selected URL in the URL (0).

Embodiment 8

Figure 38:
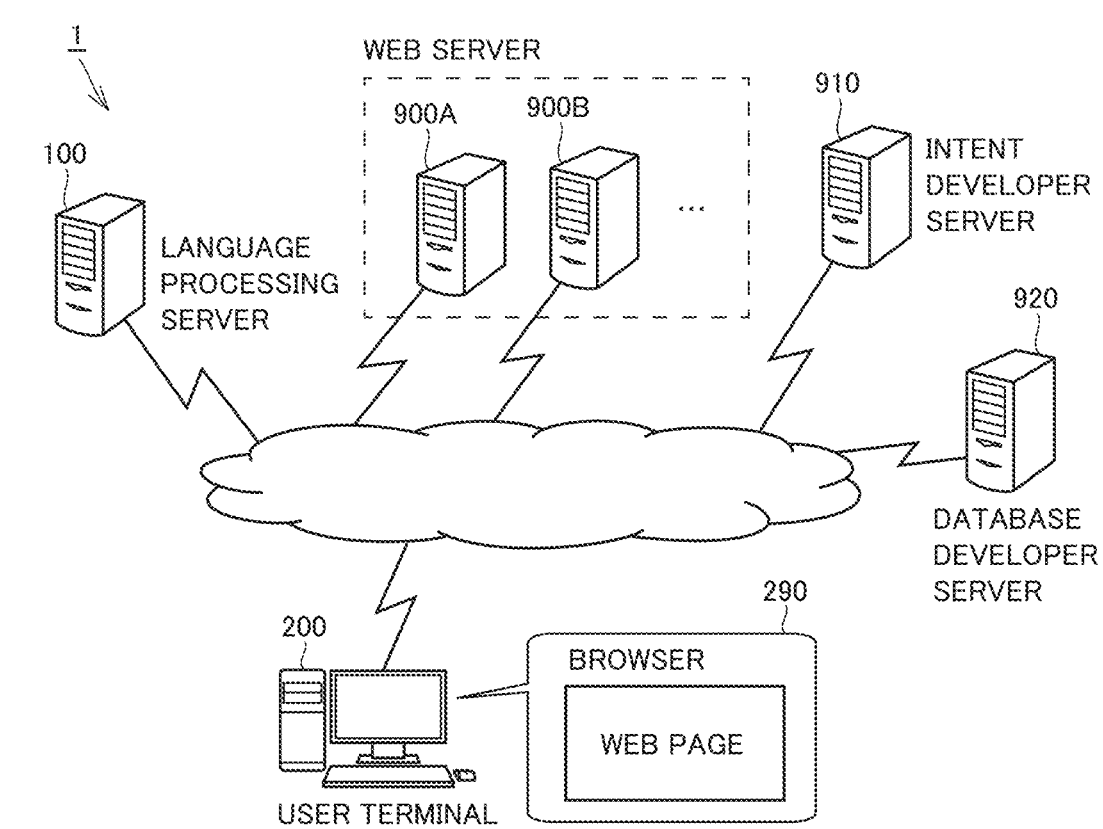
FIG. 38 is a diagram showing one example configuration of an information providing system according to Embodiment 8.

FIG. 38 is a diagram showing one example configuration of an information providing system according to Embodiment 8. The example of FIG. 38 further includes an intent developer server 910 and a database developer server 920. The intent developer server 910 is managed by a person who provides phrases that are used as new intents, using natural language processing technique. The database developer server 920 is managed by a database developer who constructs an intent-URL database.

Figure 39:
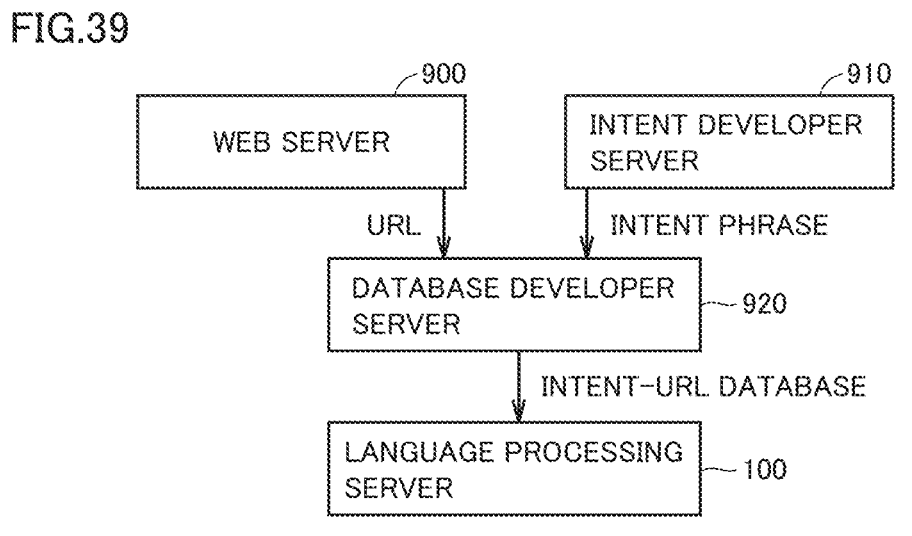

FIG. 39 is a diagram for illustrating a flow of construction of the intent-URL database in the example of FIG. 38.

As shown in FIG. 39, a web server 900, which provides web pages, registers a URL of a web page with the database developer server 920. The registered URL may include a placeholder that is associated with a specific purpose.

The intent developer server 910 registers a phrase for use as a new intent with the database developer server 920. The registered phrase may include a slot that is associated with a specific purpose.

Based on the purpose, the database developer server 920 associates a URL registered with the web server 900 with a phrase (intent) registered with the intent developer server 910, thereby constructing an intent-URL database. The database developer server 920 then provides the constructed intent-URL database to a language processing server 100.

For example, as one example of URL, the web server 900 registers a URL (A) "http://url/price[*10]" with the database developer server 920. The [*10] of the URL (A) is a placeholder associated with a purpose "name of enterprise whose stock prices are searched." The "http://url/price" is a portion of the URL (A) that defines providing the enterprise's stock prices.

In contrast, as one example of a phrase for intent, the intent developer server 910 registers a phrase (P) "show stock prices of [*11]" with the database developer server 920. The [*11] of the phrase (P) is a slot that is associated with the purpose "name of enterprise whose stock prices are searched."

The purpose [*10] and the purpose [*11] are in match. Accordingly, the database developer server 920 constructs an intent-URL database so that the URL (A) is associated with the intent identified by the phrase (P). The database developer server 920 may construct the intent-URL database by identifying multiple URLs with multiple intents in the same manner. The database developer server 920 provides the constructed intent-URL database to the language processing server 100.

At this time, the intent developer server 910 may construct a grammar-intent database in which an intent corresponding to the phrase registered with the database developer server 920 and a grammar is associated, and provides the grammar-intent database to the language processing server 100.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope. Wherever possible, the invention according to the embodiments and variations thereof are intended to be implemented independently or in combination.

What is claimed is:

1. A computer-implemented method for providing information, the method comprising:

receiving inquiry information associated with an inquiry intent through a user terminal, the inquiry information including at least one of audio and a text;

obtaining a conversation state, using a previous URL corresponding to a web page displayed to the user terminal, the conversation state including a common intent identified in an intent-URL database, wherein the common intent is the inquiry intent;

identifying an inquiry grammar conforming to the inquiry information;

filling a placeholder included in a response URL, wherein the response URL includes a URL slot corresponding to a slot included in the inquiry grammar;

obtaining a response URL corresponding to the inquiry intent, in accordance with a relationship, defined in the intent-URL database, between one or more intents and respectively corresponding one or more URLs; and providing the response URL to a browser installed in the user terminal.

2. The computer-implemented method of claim 1, further comprising:

identifying a slot in the inquiry grammar associated with the inquiry intent; and determining a value of a URL slot included in the inquiry information.

3. The computer-implemented method of claim 1, further comprising obtaining a previous URL, the previous URL corresponding to a web page which is displayed by the browser at a time of input of the inquiry information to the user terminal.

4. The computer-implemented method of claim 3, further comprising obtaining the response URL includes generating the response URL by combining the previous URL and a basic URL, which is associated with the inquiry intent in the intent-URL database.

5. The computer-implemented method of claim 4, wherein the response URL is generated in response to the inquiry information including a request for narrowing down information shown on the web page.

6. The computer-implemented method of claim 1, further comprising obtaining a previous URL, the previous URL corresponding to a web page displayed by the browser at a time of input of the inquiry information to the user terminal, and the inquiry intent is obtained in response to the previous URL being a predetermined URL.

7. The computer-implemented method of claim 1, further comprising:

obtaining the response URL includes filling a placeholder, included in a URL associated with the inquiry intent in the intent-URL database, with at least a portion of the inquiry information.

8. The computer-implemented method of 1, further comprising updating the relationship in the intent-URL database.

9. The computer-implemented method of claim 1, prior to obtaining an inquiry intent using speech recognition via a browser installed in a user terminal, further comprising:

displaying an audio input feature via a browser installed in a user terminal.

10. The computer-implemented method of claim 1, further comprising:

retrieving data associated with the response URL; and displaying the retrieved data on the browser installed in the user terminal.

11. A computer system, comprising:

at least one processor; and memory including instructions that, when executed by the at least one processor, cause the computer system to:

receiving inquiry information associated with an inquiry intent through a user terminal, the inquiry information including at least one of audio and a text;

obtain a conversation state, using a previous URL corresponding to a web page displayed to the user terminal, the conversation state including a common intent identified in an intent-URL database, wherein the inquiry intent is the common intent;

identify an inquiry grammar conforming to the inquiry information;

fill a placeholder included in a response URL, wherein the response URL includes a URL slot corresponding to a slot included in the inquiry grammar;

obtain a response URL corresponding to the inquiry intent, in accordance with a relationship, defined in the intent-URL database, between one or more intents and respectively corresponding one or more URLs; and provide the response URL to a browser installed in the user terminal.

12. The computer system of claim 11, wherein the instructions when executed further cause the computer system to:

identify a slot in the inquiry grammar associated with the inquiry intent; and determine a value of a URL slot included in the inquiry information.

13. The computer system of claim 11, wherein the instructions when executed further cause the computer system to:

obtain a previous URL, the previous URL corresponding to a web page which is displayed by the browser at a time of input of the inquiry information to the user terminal.

14. The computer system of claim 13, wherein the instructions when executed further cause the computer system to:

obtain the response URL includes generating the response URL by combining the previous URL and a basic URL, which is associated with the inquiry intent in the intent-URL database.

15. The computer system of claim 11, wherein the response URL is generated in response to the inquiry information including a request for narrowing down information shown on the web page.

16. The computer system of claim 11, wherein the instructions when executed further cause the computer system to:

obtain a previous URL, the previous URL corresponding to a web page displayed by the browser at a time of input of the inquiry information to the user terminal, and the inquiry intent is obtained in response to the previous URL being a predetermined URL.

17. The computer system of claim 11, wherein the instructions when executed further cause the computer system to:

obtain the response URL includes filling a placeholder, included in a URL associated with the inquiry intent in the intent-URL database, with at least a portion of the inquiry information.

18. The computer system of claim 11, wherein the instructions when executed further cause the computer system to:

retrieve data associated with the response URL; and display the retrieved data on the browser installed in the user terminal.

*     *     *     *     *